(12) United States Patent
Eck et al.

(10) Patent No.: US 10,647,508 B2
(45) Date of Patent: May 12, 2020

(54) STORAGE STATION FOR STORING CONTAINERS TRANSPORTED BY UNMANNED VEHICLES

(71) Applicants: Brandon Eck, Washington, DC (US); Brett Wagner, Washington, DC (US)

(72) Inventors: Brandon Eck, Washington, DC (US); Brett Wagner, Washington, DC (US)

(*) Notice: Subject to any disclaimer, the term of this patent is extended or adjusted under 35 U.S.C. 154(b) by 201 days.

(21) Appl. No.: 15/821,266

(22) Filed: Nov. 22, 2017

(65) Prior Publication Data

US 2019/0152701 A1 May 23, 2019

(51) Int. Cl.
| | | |
|---|---|---|
| *B64F 1/32* | (2006.01) | |
| *B65G 1/06* | (2006.01) | |
| *B64F 1/36* | (2017.01) | |
| *B65G 1/04* | (2006.01) | |
| *B65G 67/04* | (2006.01) | |
| *B65G 67/24* | (2006.01) | |
| *B65G 1/137* | (2006.01) | |

(52) U.S. Cl.
CPC ............ *B65G 1/06* (2013.01); *B64F 1/32* (2013.01); *B64F 1/368* (2013.01); *B65G 1/0464* (2013.01); *B65G 1/137* (2013.01); *B65G 67/04* (2013.01); *B65G 67/24* (2013.01); *B64C 2201/128* (2013.01); *B65G 2814/0302* (2013.01); *B65G 2814/0313* (2013.01); *B65G 2814/0398* (2013.01)

(58) Field of Classification Search
None
See application file for complete search history.

(56) References Cited

U.S. PATENT DOCUMENTS

| | | | |
|---|---|---|---|
| 9,387,928 | B1 | 7/2016 | Gentry et al. |
| 9,505,493 | B2 * | 11/2016 | Borko ............... B64C 39/024 |
| 2014/0254896 | A1 | 9/2014 | Zhou et al. |
| 2015/0006005 | A1 | 1/2015 | Yu et al. |
| 2015/0120094 | A1 | 4/2015 | Kimchi et al. |
| 2015/0332206 | A1 | 11/2015 | Trew et al. |
| 2016/0207627 | A1 | 7/2016 | Hoareau et al. |
| 2016/0209839 | A1 | 7/2016 | Hoareau et al. |
| 2016/0257423 | A1 | 9/2016 | Martin |
| 2018/0203465 | A1 * | 7/2018 | Suzuki ................. A47G 29/14 |
| 2019/0009906 | A1 * | 1/2019 | von Gostomski ..... A47G 29/14 |

OTHER PUBLICATIONS

Amazon Prime Air. Accessed Jan. 26, 2017, 9 pages. https://www.amazon.com/Amazon-Prime-Air/b?ie=UTF8&node=8037720011.

(Continued)

*Primary Examiner* — Mark C Hageman
(74) *Attorney, Agent, or Firm* — Smith Gambrell & Russell LLP

(57) ABSTRACT

A storage station includes a housing defining an inner space, and having a top and side passage for passage of a container. One or more funnels are provided at the top passage for guiding the passage of containers therethrough, and an actuator system is provided for, selectively, engaging a container with a suspension system and disengaging a container from a suspension system. Also provided is a transfer system that is inclusive of the storage station, a UAV, a reusable container; and methods of transferring reusable containers between UAVs, the storage station, and other transport stations.

22 Claims, 13 Drawing Sheets

(56) References Cited

OTHER PUBLICATIONS

Flirtey. Accessed Jan. 26, 2017, 8 pages. http://flirtey.com/about/.
Starship Technologies. Accessed Jan. 26, 2017, 4 pages. ttps://www.starship.xyz/.
Dispatch Joins The Ground Delivery Club. Accessed Jan. 26, 2017, 8 pages. https://techcrunch.com/2015/11/10/dispatch-joins-the-ground-delivery-club/.
Matternet. Accessed Jan. 26, 2017, 8 pages. https://mttr.net/product.
Matternet. Press Release: Matternet Partners with Mercedes-Benz to Create the Future of Delivery. Sep. 7, 2016. 3 pages. Accessed Jan. 26, 2017. https://mttr.net/images/MatternetPressKit.zip.
Horsefly: Autonomous Drone Delivery System. Accessed Jan. 26, 2017, 12 pages. http://workhorse.com/aerospace.
Google/Alphabet Project Wing. Accessed Jan. 26, 2017, 4 pages. https://x.company/wing/.
DHL Press Release: Successful Trial Integration of DHL Parcelcopter into logistics Chain. Accessed Jan. 26, 2017, 2 pages. http://www.dhl.com/en/press/releases/releases_2016/all/parcel_ecommerce/successful_trial_integration_dhl_parcelcopter_logistics_chain.html.

* cited by examiner

FIG. 1a
FIG. 1b
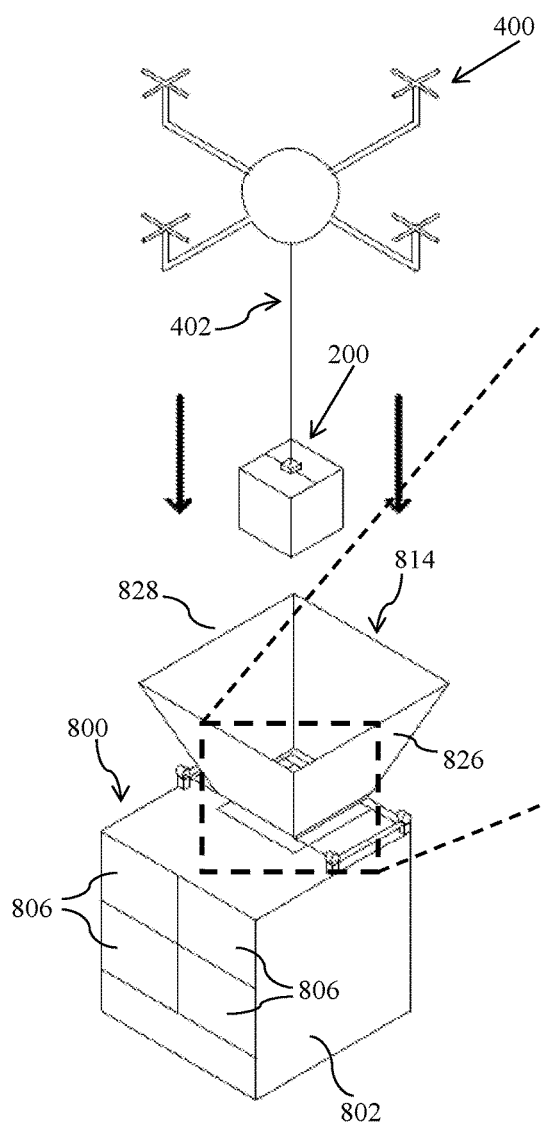
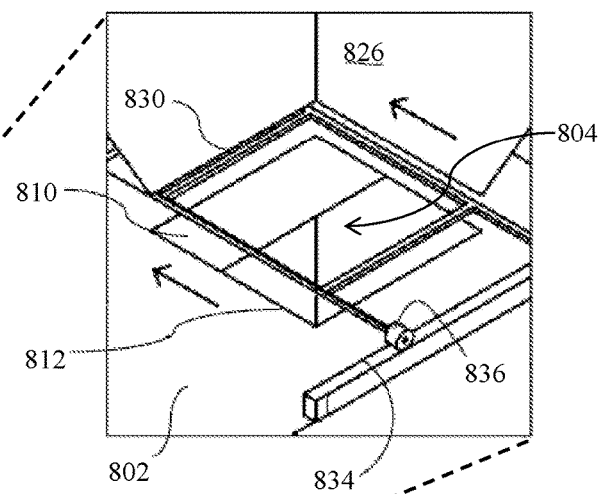

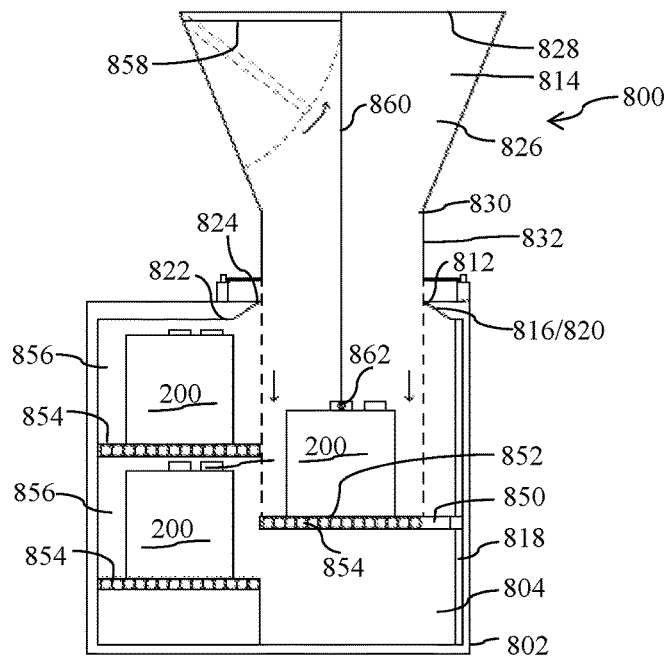
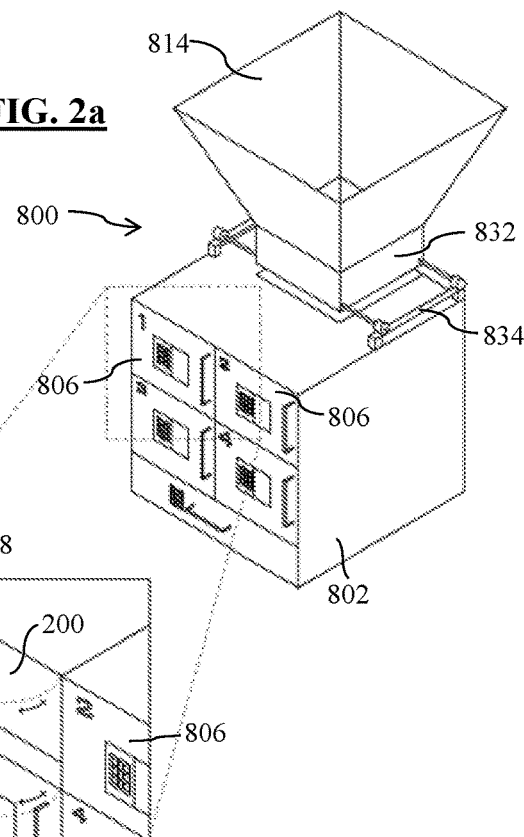

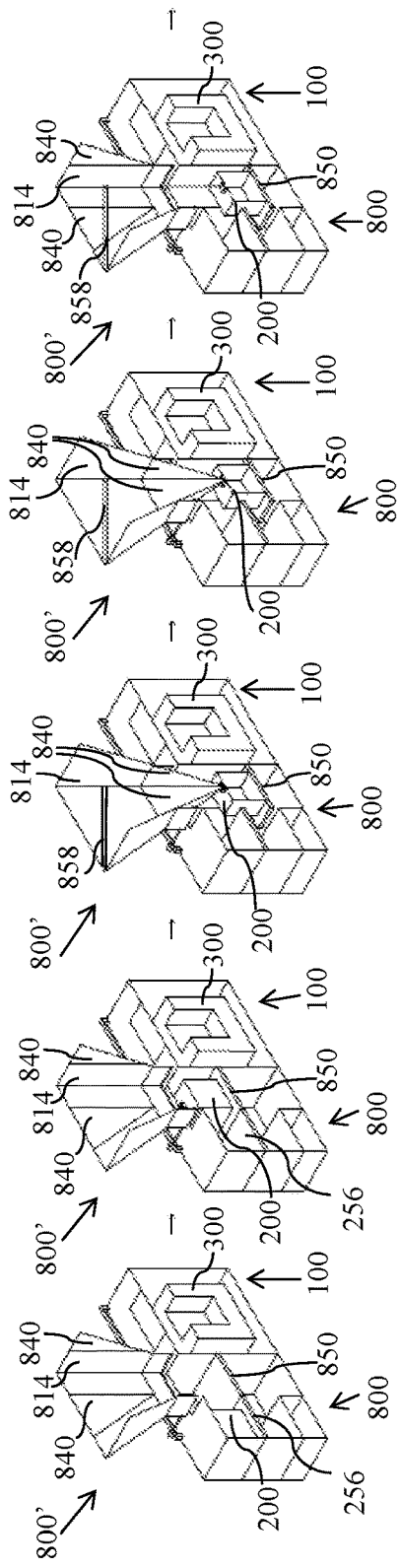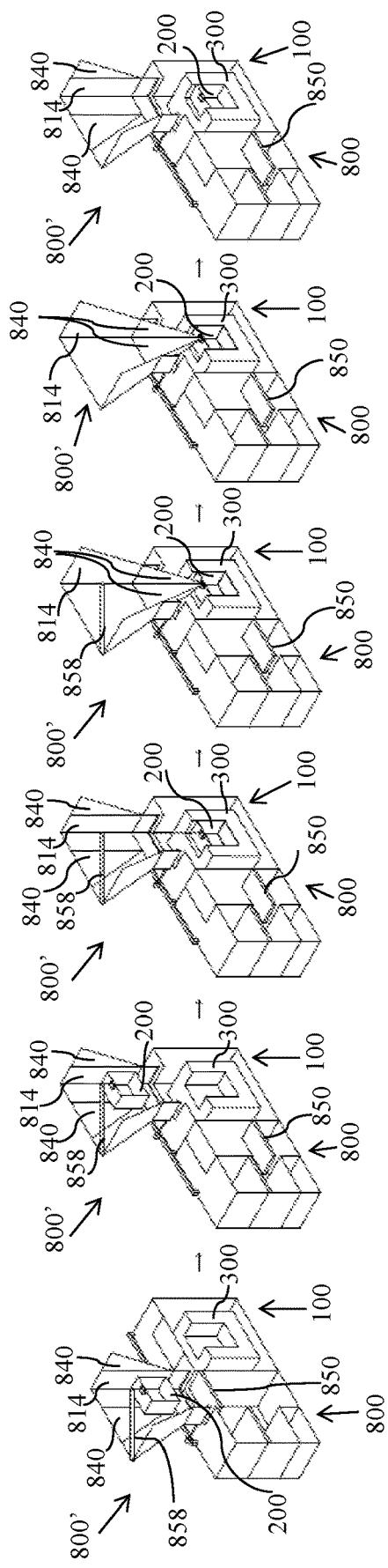

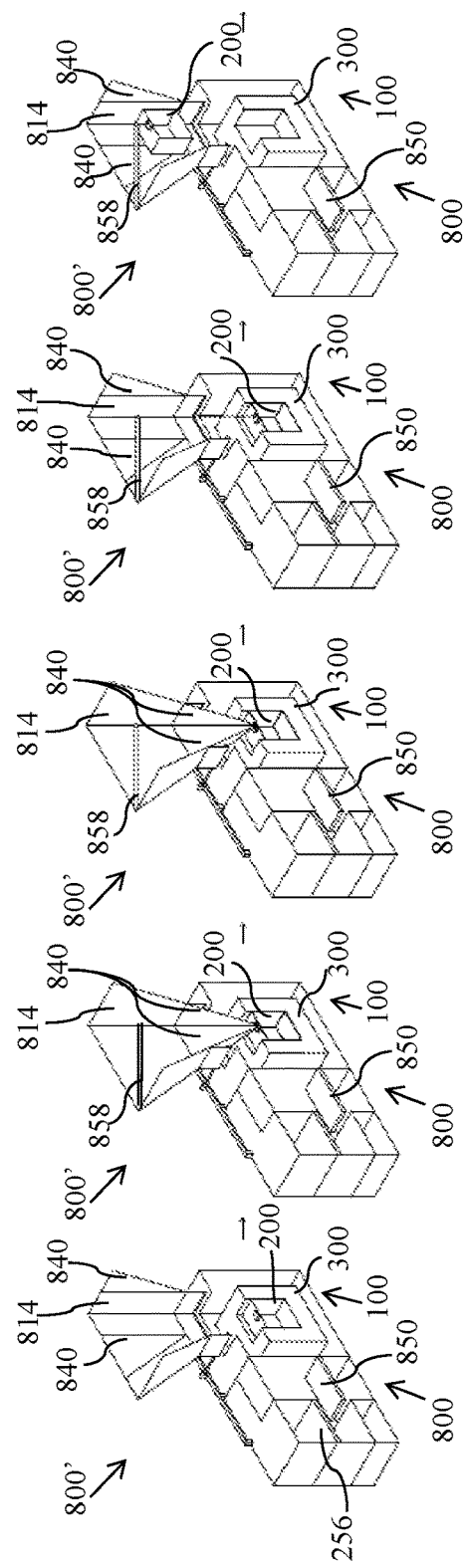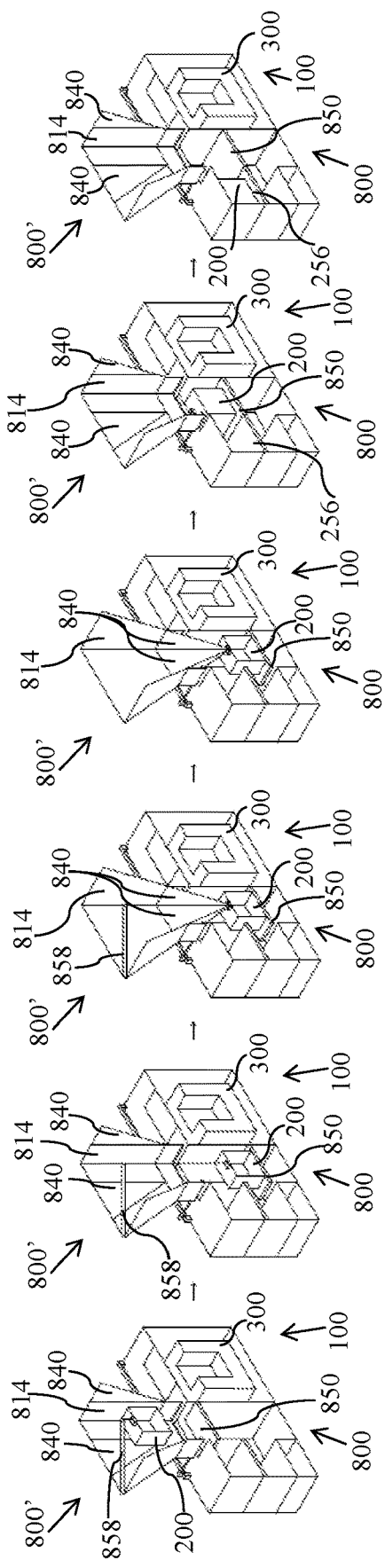

STORAGE STATION FOR STORING CONTAINERS TRANSPORTED BY UNMANNED VEHICLES

FIELD OF THE INVENTION

The present invention relates to an autonomous storage station for receiving and storing containers transported by unmanned vehicles, and for transferring stored containers between unmanned vehicles and other cooperating stations in a delivery system. The present invention also relates to delivery systems incorporating such a storage station and methods of using such a storage station.

BACKGROUND OF THE INVENTION

Recent technological developments have allowed a number of industries to benefit from the low cost and efficient operations of unmanned aerial vehicles (UAVs). For example, the agriculture industry uses UAVs to survey land and monitor irrigation systems; the filming industry uses UAVs to capture camera shots that are not possible using conventional filming methods; and the architecture industry uses UAVs to create 3D images of properties for rendering structural landscapes.

An industry of particular importance that may also benefit from use of UAVs is the delivery industry. Many companies are beginning to realize the potential benefits UAVs may provide to the delivery industry, and are developing UAV-based delivery methods. One such UAV-based delivery method is a fully autonomous 'point-to-point' delivery method, where a UAV flies directly from the sender to the recipient.

However, current UAV-based point-to-point delivery methods present certain concerns in that the proximity of the UAV to bystanders, wildlife and/or physical structures along the delivery route may be undesirable due to the potential noise pollution, privacy concerns relative to drone cameras, demands associated with UAV landing space, and safety issues such as potential in-flight and landing collisions.

One solution that has been presented thus far is the use of a transfer station and system for transferring delivery containers between a UAV and an unmanned ground vehicle (UGV), such as that disclosed in U.S. patent application Ser. No. 15/416,639, the entire contents and disclosure of which is hereby incorporated herein by reference. With such a transfer station and system, a UAV carrying an item for delivery may transfer the item to a UGV, and the UGV may then complete at least a portion of the delivery route along the ground, thereby avoiding concerns associated with a UAV flight path. The UGV may perform any of an initial portion, a final portion, or an intermediate portion of a delivery route, and may optionally perform only a limited ground transport after which the UGV may arrive at a second transfer station to transfer the item to a second UAV.

However, there is foreseen a potential that the demand for automated delivery services might exceed the transport capacity offered by the transfer station and system of U.S. Ser. No. 15/416,639; and it is preferable, therefore, that there be provided some means for compensating for any such increase in delivery demand.

SUMMARY OF THE INVENTION

A storage station is provided for receiving and storing containers, including containers received autonomously from an unmanned aerial vehicle (UAV) or manually from a user. The storage station is also capable of autonomously transferring stored containers to UAVs and other cooperating stations in a delivery system, and enabling manual pick-up of a container by a user. Reception and storage of a container from a UAV to the storage station may be referred to as a UAV drop-off transfer; conveyance from the storage station to a UAV may be referred to as a UAV pick-up transfer. Also, conveyance of a container to the storage station from another cooperating station may be referred to as an inter-station storage transfer, and conveyance of a container from the storage station to another cooperating station may be referred to as an inter-station transport transfer.

The storage station is inclusive of a housing defining an inner space, the inner space including at least one, and preferably a plurality of storage compartments. The housing has a number of side passages connecting the storage compartments with an outer environment for the passage of storage containers, and a top passage that connects the inner space of the housing with an outer environment for passage of storage containers. An upward funnel is provided within the inner space of the housing, the upward funnel having a chute with a lower enlarged inlet and an upper contracted outlet, the upper contracted outlet being dimensioned to communicate with the top passage of the housing for passage of a container. A downward funnel is supported above the housing, the downward funnel having a chute with an upper enlarged inlet and a lower contracted outlet, the lower contracted outlet being dimensioned to communicate with the top passage of the housing for passage of a container. An actuator system is provided for, selectively, engaging a container with a suspension system and disengaging a container from a suspension system. The actuator system is operable to cooperate with both a suspension system of a UAV and a suspension system built into the downward funnel.

The downward funnel may be supported movably along a track that extends along a top of the housing; and the housing may be a modular housing that aligns and engages with at least one other modular housing to form a multi-unit station. The other modular housings with which the storage station may engage in a multi-unit station may include other storage stations as well as other modular station types, including one or more transfer stations such as that disclosed in U.S. Ser. No. 15/416,639. When two or more modular housings are aligned and engaged as a multi-unit station, the tracks extending along the tops of the modular housings also align and engage with one another in series, and the downward funnel is movable along the aligned and engaged tracks for selectively moving between the individual modular housings.

In one example, the storage station may be aligned and engaged with a transfer station such that the tracks extending along the top of the storage station are aligned and engaged with tracks extending along the top of the transfer station, and a single downward funnel may be movable between the storage station and the transfer station for conveying containers from the storage station to the transfer station, and vice versa. In such an example, the storage station may receive and store incoming containers that exceed the storage capacity of the transfer station, thereby allowing continued delivery of containers to the combined storage and transfer multi-unit station even though the transfer station itself might be at full capacity or otherwise incapable of directly receiving containers (e.g., as when a UGV in the transfer station is at full capacity, or when no UGV is present in the transfer station). The storage station may also operate to replenish UGVs that arrive at the transfer station with containers that have been stored in the storage station, for example, when a container is taken from a UGV by a UAV or when a UGV returns to the transfer station without a container. Such a combined storage and transfer multi-unit station allows for continued delivery services at the transfer station despite fluctuations in demand and supply of containers.

The actuator system is inclusive of one or more extendable and retractable slats that, when in the extended position, interact with a capture system of a container for, selectively, engaging the container with a load-bearing element of a suspension system (e.g., a UAV or funnel suspension system) and disengaging the container from a load-bearing element of a suspension system. The one or more slats interact with the capture system by, when in the extended position, moving the slats from a first position in which a capture space of the capture system is closed to a second position in which the capture space of the capture system is open.

The housing further includes a number of side doors that open and close the side passages to the storage compartments, a top hatch that opens and closes the top passage, an elevator platform that inserts and extracts containers from respective storage compartments, and a control system for controlling the elevator platform, the side doors, and the top hatch. The control system may direct the side doors based on either a user input (e.g., a passcode) or a proximity determination that a container is to be inserted into a storage compartment through a side passage, either manually by a user or through an automated process (e.g., by a specialized UGV). The control system may open the top hatch based on a determination that a UAV and/or a downward funnel is positioned above the top passage for accessing the inner elevator platform. The control system may also condition the opening of the top hatch based on a further determination that a container is present in the inner space of the housing at a position on the elevator platform that is predetermined to align the container with the top passage of the housing. The control system may also monitor and direct movements of the elevator platform, manage individual container storage compartments, and open or close side doors to the storage compartments. The control system may also include a communications system for communicating with UAVs, other modular stations in a multi-unit station (e.g., other engaged storage stations and/or transfer stations), and/or one or more remote delivery servers.

Also provided is a transfer system that is inclusive of one or more storage stations; one or more UAVs having a suspension system for carrying a container; and one or more other modular stations, which may include one or more transfer stations that interact with one or more UGVs; and one or more containers that are transferrable between the storage station, the UAV, the other modular stations, and the UGVs. The container is dimensioned for reception within a holding space of the elevator platform, and the container is inclusive of a capture system for engaging a suspension system (e.g., a UAV suspension system; a funnel suspension system; etc.).

The capture system of the container is inclusive of a shell defining a capture space, one or more panels that open and close the capture space, and one or more biasing elements for biasing the panels to a closed position. The capture system of the container is operable to interact with the actuator system of the storage station and a suspension system. A suspension system operable with the capture system, which may include UAV and funnel suspension systems, comprises an extendable and retractable cable, and a load-bearing element at an end of the cable, the load-bearing element being dimensioned for reception within the capture space of the capture system. In operation, the actuator system will interact with the capture system to open and close the capture space for, selectively, engaging the capture system with the suspension system via insertion of the load-bearing element into the capture space, and disengaging the capture system from the suspension system via removal of the load-bearing element from the capture space.

A container may be transferred from a UAV to the storage station by positioning the elevator platform in the inner space of the storage station housing at a position that is predetermined to align the elevator platform holding space with the top passage of the housing, and which is further predetermined to align the capture system of a container (when received at the elevator platform holding space) with an actuator system of the storage station. The UAV is then positioned vertically above the storage station, at a position that aligns the UAV suspension system with the top passage of the housing, with the container supported on the suspension system. The UAV suspension system is then lowered to pass the container through the top passage of the housing and into the elevator platform holding space. Once positioned at the elevator platform holding space, the slats of the actuator system are extended to move the panels of the container capture system to the open position, and the UAV suspension system is then raised to remove the load-bearing element from the capture space of the capture system and out the top passage of the housing. The slats of the actuator system are then retracted to permit the panels of the container capture system to return to a closed position, and the storage station then controls the elevator platform to move the container to a storage compartment.

A container may be transferred from a storage station to a UAV by controlling the elevator platform to extract a container from a storage compartment, and then moving the elevator platform to a position within the inner space of the storage station housing that is predetermined to align the container with the top passage of the housing, and to also align the container capture system with the actuator system. The UAV is then positioned vertically above the storage station, at a position that aligns the suspension system of the UAV with the top passage of the housing. The slats of the actuator system are then extended to move the panels of the container capture system to the open position; and the UAV suspension system then lowers a retractable cable having a load-bearing element through the top passage of the housing to insert the load-bearing element into the capture space of the container capture system, with the extended actuator system slats assisting in guiding the load-bearing element into the capture space. The actuator system slats are then retracted to permit the panels of the capture system to return to a closed position, entrapping the load-bearing element within the capture space; after which the retractable cable is raised to lift the container from the holding space of the elevator platform and out the top passage of the storage station housing.

In a case where the storage station is engaged with a transfer station to form a multi-unit station, the multi-unit station will be provided with a downward funnel having a funnel suspension system that includes an extendable arm located in the funnel, a retractable cable, and a load-bearing element attached to an end of the cable that is dimensioned for reception and engagement in a container capture system. The extendable arm is moveable between a stowed position and an extended position. In the stowed position, the extendable arm is stored in a manner to prevent obstruction to a UAV suspension system or passage of a container through the downward funnel during transfer into or out of the storage station. In the extended position, the extendable arm is positioned to align the load-bearing element of the funnel suspension system for engagement with a capture system of a container that is positioned in the holding space of the elevator platform while the elevator platform is at the predetermined loading position.

In such a case when the storage station is engaged with a transfer station to form a multi-unit station, a container may be transferred from the storage station to a UGV parked in the transfer station using the downward funnel having the funnel suspension system. For example, the storage station may direct the elevator platform to extract a container from a storage compartment via one or more conveyer belts (or other conveyance means). The conveyor belts are configured, when extracting a container from an individual storage compartment, to position the container at the designated holding space of the elevator platform. The elevator platform then moves to the predetermined position that vertically aligns the container with the top passage, and aligns the container capture system with both the actuator system and the funnel suspension system. The extendable arm in the downward funnel is then moved to the extended position to vertically align the load-bearing element thereof with the container capture system. The actuator system slats are then extended to move the panels of the container capture system to the open position, and the retractable cable of the funnel suspension system is then lowered to pass the load-bearing element thereof through the top passage of the housing and into the capture space of the container capture system. The actuator system slats are then retracted to permit the panels of the capture system to return to a closed position, entrapping the load-bearing element within the capture space. The retractable cable is then raised to lift the container from the elevator platform, though the top passage of the housing, and into the downward funnel. The downward funnel, with the container suspended therein via the funnel suspension system, is then laterally moved along the tracks atop the multi-unit station to a position that aligns the funnel suspension system with a top passage of the transfer station housing. The retractable cable of the funnel suspension system is then lowered to pass the container through the top passage of the transfer station housing and to place the container into a holding space of a UGV parked at a predetermined loading position within the transfer station. The actuator system slats are then extended to move the panels of the container capture system to the open position, and the retractable cable of the funnel suspension system is then raised to remove the load-bearing element from the capture space. Once the retractable cable of the funnel suspension system is retracted fully from the transfer station housing, the actuator system slats are then retracted to permit the panels of the capture system to return to a closed position. The UGV, with the container loaded therein, may then exit the transfer station to transport the container to another destination.

When the storage station is engaged with a transfer station to form a multi-unit station, a container may also be transferred from a UGV parked in the transfer station to a storage compartment in the storage station by positioning the UGV at a loading position within the transfer station housing that is predetermined to align the holding space of the UGV with the top passage of the transfer station housing, and also aligning the capture system of a container held in the holding space of the UGV with the actuator system. The downward funnel's extendable arm is then moved to the extended position vertically above the transfer station in a manner to align the load-bearing element thereof with the container capture system. The actuator system slats are then extended to move the panels of the container capture system to the open position, and the retractable cable of the funnel suspension system is then lowered to pass the load-bearing element through the top passage of the transfer station housing and into the capture space. The actuator system slats are then retracted to permit the capture system panels to return to a closed position, entrapping the load-bearing element within the capture space. The retractable cable of the funnel suspension system is raised to lift the container from the holding space of the UGV, out the top passage of the transfer station housing, and into the downward funnel. The downward funnel, with the container suspended therein by the funnel suspension system, is then laterally moved along the tracks atop the multi-unit station to a position that aligns the funnel suspension system with the top passage of the storage station housing. The retractable cable of the funnel suspension system then lowers the container down into the storage station and onto the holding position of the elevator platform. The actuator system slats are then extended to move the panels of the container capture system to the open position, and the retractable cable of the funnel suspension system is then raised to remove the load-bearing element from the capture space. Once the retractable cable of the funnel suspension system is retracted fully from the storage station housing, the actuator system slats are then retracted to permit the capture system panels to return to a closed position. The elevator platform then moves to align with a storage compartment, and the conveyer belts move the container from the elevator platform and into the aligned storage compartment.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate several embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIG. 1a shows a storage station according to the present invention, in use with a funnel according to the present invention;

FIG. 1b shows a close-up sectional view of the storage station in FIG. 1a, illustrating a portion of a funnel and a top hatch of the storage station;

FIG. 2a shows another view of a storage station according to the present invention;

FIG. 2b shows a close-up sectional view of the storage station in FIG. 2a, illustrating a side door of the storage station in FIG. 2a;

FIG. 2c shows a cross-sectional elevation view of the storage station in FIG. 2a;

FIG. 3b shows an open view of the reusable container in FIG. 3a;

FIG. 10b shows a cross-sectional elevation view of the isolated transfer station in FIG. 10a;

FIGS. 12a-12k show one example of an inter-station transport transfer in a multi-unit station according to FIG. 9; and FIGS. 13a-13k show one example of an inter-station storage transfer in a multi-unit station according to FIG. 9.

DETAILED DESCRIPTION OF THE INVENTION

The following disclosure discusses the present invention with reference to the examples shown in the accompanying drawings, though does not limit the invention to those examples.

The present invention is inclusive of an autonomous storage station for storing reusable containers that are transferrable between the storage station and UAVs. A storage station according to the present invention may also store reusable containers that are transferrable between the storage station and other engaged stations, including other storage stations and transfer stations, such as the transfer station disclosed in U.S. Ser. No. 15/416,639, the entire contents and disclosure of which is hereby incorporated herein by reference. The invention is further inclusive of a storage system for receiving and storing reusable containers for delivery via one or more UAVs and/or more UGVs. The invention may also serve as a method of transferring reusable containers between the storage station, UAVs, and UGVs.

Figure 9:
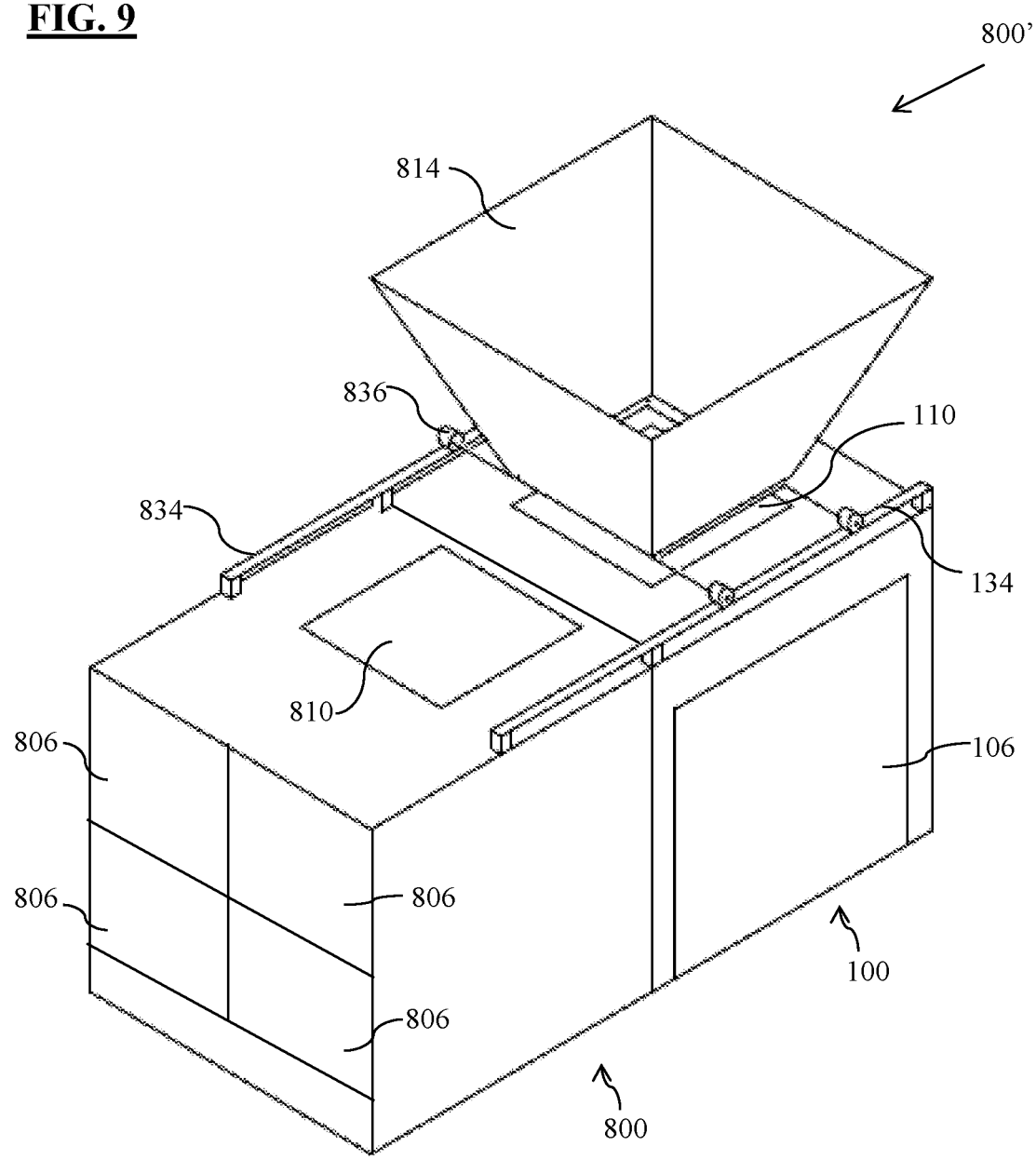
FIG. 9 shows one example of a multi-unit station that includes a transfer station and a storage station according to FIGS. 1a-1b.

FIG. 1a shows an example of a storage station 800 according to the present invention. The storage station 800 includes a housing 802 that defines an inner space 804; the housing 802 has side doors 806 that open and close side passages 808 between the inner space 804 and an outer environment, and a top hatch 810 that opens and closes a top passage 812 between the inner space 804 and an outer environment. A downwardly tapering funnel 814 is supported above the housing 802, and an upwardly tapering funnel 816 is provided within the housing 802. As shown in FIG. 9, a storage station 800 may be a component of a multi-unit station 800' in which the storage station 800 is directly attached to a transfer station 100. The storage station 800 may be engaged to any side of the transfer station 100, with exception of the side on which the front passage 108 is located for entrance and exit of a UGV 400.

The side passages 808 of the storage station housing 802 are each dimensioned for a reusable container 200 to be inserted and extracted therethrough. The top passage 812 of the housing 802 is dimensioned for a reusable container 200 to pass therethrough, for transfer between a UAV 400 outside the storage station 800 and the elevator platform 850 inside the storage station 800. Preferably, the top passage 812 is dimensioned to closely correspond with the dimensions of the container 200 and is oriented to correspond with the orientation of a holding space 852 of the elevator platform 850 such that, when passing through the top passage 812, the container 200 is oriented to correspond with the orientation of the holding space 852.

The downwardly tapering funnel 814 above the storage station housing 802 guides the transfer of a container 200 from a UAV 400 above the storage station 800 to an elevator platform 850 within the storage station 800; and the upwardly tapering funnel 816 within the housing 802 guides the transfer of a container 200 from the elevator platform 850 to a UAV 400 outside the storage station 800. Preferably, both the downwardly tapering funnel 814 and the upwardly tapering funnel 816 are configured to guide containers 200 that pass therethrough to align with the orientation of the top passage 812. Orientation of the container 200 within the funnels 814/816 may be achieved in any number of ways, including the use of specially shaped surfaces, magnets, hooks, mechanical arms, and combinations thereof.

In examples where the storage station 800 is a stand-alone structure, the side passages 808 and the top passage 812 may communicate the inner space 804 with a common outer environment. In other examples, such as when the storage station 800 is incorporated in another structure, the side passages 808 may communicate the inner space 804 with an outer environment that is different from an outer environment with which the top passage 812 communicates the inner space 804. For example, a storage station 800 may be provided in a building, with the top passage 812 (optionally via a top hatch 810) opening to a roof of the building and the side passages 808 (optionally via side doors 806) opening to an internal space of the building.

The elevator platform 850 will include a holding space 852 dimensioned to receive a container 200. Preferably, the holding space 852 will be dimensioned to correspond with the dimensions of the container 200 and/or may include protruding structures for supporting the reusable container 200. In one example, the protruding structures may serve to hold the container on the elevator platform 850 at a specific and non-flexible location; and the protruding structures may additionally have sensors on them to notify the storage station of the presence or absence of the container 200 on the elevator platform 850.

The storage station 800 includes an elevator platform guiding system 818 that moves the elevator platform 850 between several predetermined positions within the inner space 804 of the housing 802, including a loading position and several storage positions. The loading position is a position that is predetermined to align the holding space 852 of the elevator platform 850 with the top passage 812, such that a container 200 may easily be delivered into and taken from the holding space 802 without requiring a complex maneuvering of the container 200. The loading position is also a position that is predetermined to align the capture system 210 of a container 200 that is held at the holding space 852 of the elevator platform 850 with the actuator system 838. The storage positions are positions that align the elevator platform 850 with individual storage compartments 856, such that a conveyor belt 854 may move a container 200 from the elevator platform 850 into the storage compartment 856, and vice versa. When positioned at the predetermined loading position, a container 200 may be reliably delivered to or taken from the holding space 852 of the elevator platform 850 via a simple raising or lowering motion of a suspension system (e.g., a UAV or funnel suspension system) through the top passage 812, without requiring any lateral correction other than that provided by one of the funnels 814/816. When positioned at a predetermined storage position, a container 200 may be reliably moved from the elevator platform 850 and into the storage compartment 856 (or vice versa) via a direct lateral movement under the force of convey belts 854 that may be provided at one or both of the elevator platform 850 and the storage compartment 856.

An elevator platform guiding system 818 may take a variety of forms provided it functions to reliably move the elevator platform 850 between the predetermined positions and to effect insertion and extraction of containers 200 relative to the storage compartments 856. For example, a guiding system 818 may include a multi-axis pulley and/or rail system that can pinpoint the location of the elevator platform 850 anywhere within the inner space 804 of the housing 802.

The upwardly tapering funnel 816 is provided below the top passage 812, and includes a chute 820 having a lower enlarged inlet 822 and an upper contracted outlet 824. The chute 820 is dimensioned such that the lower enlarged inlet 822 has a length and width sufficient to ensure reliable reception of a container 200 that is lifted vertically from a holding space 852 of the elevator platform 850 positioned at the predetermined loading position; and such that the upper contracted outlet 824 has a length and width that corresponds with the length and width of the top passage 812 of the housing 802.

The downwardly tapering funnel 814 includes a chute 826 having an upper enlarged inlet 828 and a lower contracted outlet 830. In the example shown in FIGS. 1a-1b the chute 826 is formed in a square-shape with four sloping surfaces; though the chute 826 may be formed in any preferred shape with any number of surfaces, including a conical shape formed with a single curved surface. The chute 826 is dimensioned such that the lower contracted outlet 830 has a length and width that corresponds with the length and width of the top passage 812 of the housing 802.

In some examples, such as that shown in FIG. 1b, the lower contracted outlet 830 of the chute 826 may communicate with the top passage 812, without any intermediate structure therebetween. In other examples, such as that shown in FIGS. 2a and 2c, funnel 814 may include an intermediate channel 832 that communicates the lower contracted outlet 830 of chute 826 with the top passage 812. When the storage station 800 is a stand-alone structure, it is preferable the upper enlarged inlet 828 have a length and width that is no larger than the length and width of the housing 802. However, if the storage station 800 is incorporated in another structure, then the top enlarged inlet 828 may have any length and/or width suitable for use with the larger structure. For example, if the storage station 800 is provided in a building, with the top passage 812 (optionally via a top hatch 810) opening to a roof of the building, then the chute 826 may be constructed within the roof of the building and the upper enlarged inlet 828 may have a length and/or width that exceeds the length and/or width of the housing 802. The height of the funnel 814 may be varied as needed.

The funnel 814 may be constructed with any number of alternative shapes and configurations that may be selected based on the environment in which the storage station 800 is to be deployed. For example, when constructing a storage station 800 for use in an environment with snow accumulation, it may be preferable to construct the funnel 814 to mitigate snow buildup by constructing the sides of the funnel 814 with a plurality of openings sized to allow the passage of snow, or a series of downward angled surfaces that allow the passage of snow. The funnel 814 may also be constructed with deflectors or caps that deploy in inclement weather situations to inhibit the collection of snow, sleet, and/or ice within the funnel 814. As another example, when constructing a storage station 800 for use in an environment with ice accumulation, it may be preferable to construct the funnel 814 (and optionally the housing 802) with heating coils for melting away accumulated ice. Similarly, when constructing a storage station 800 for use in high-heat environments, it may be preferable to construct the funnel 814 (and optionally the housing 802) with fans for providing conductive cooling and/or surface treatments that reduce heat retention.

The funnel 814 may be mounted directly to the top of the housing 802, in a fixed position; or may be supported movably above the housing 802. For example, as shown in FIGS. 1b and 2a, the funnel 814 may be supported on a track 834 and may include a movement system at the base thereof. With such a construction, individual storage stations 800 may be positioned side-by-side to construct a multi-unit station 800', with the respective tracks 834 of each housing 802 aligned and engaged such that a single funnel 814 may move therealong to separately service each of the individual storage stations 800 as needed. The track 834 may be a separate structure mounted on the housing 802, or may be constructed monolithically in the housing 802 such as a recessed canal through which a base of the funnel 814 may slide. In some examples, a multi-unit station may include any number of storage stations 800 and any number of transfer stations 100 engaged in series, such as the multi-unit station 800' in FIG. 9, with the tracks 834 of the storage stations 800 and the tracks 134 of the transfer stations 100 engaged in corresponding series atop the respective housings, such that the funnel 814 may move to align vertically above a top passage in each respective housing to serve each respective station as needed.

FIG. 1b shows one example of a movement system that includes wheels 836 mounted to the base of the funnel 814 and aligned to roll along the track 834. The wheels 836 may be motorized for rotating under the power of a funnel motor provided at the base of the funnel 814. Alternatively, the wheels 836 may be non-motorized, and a pulley system may be provided whereby one or more pulley motors at one or both sides of the housing 802 (or at one or both ends of a multi-unit station) are joined to the funnel 814 by cables or chains, with the wheels 836 rotating under the force of the pulley motors.

When the funnel 814 is supported movably above a multi-unit station, the funnel 814 may be constructed with slanted surfaces at its base that act as plows during the lateral movements of the funnel 814 to aid in the removal of debris that may have collected on the top surface of the multi-unit station (e.g., built-up snow; fallen leaves; etc.). With such a construction, the multi-unit station may be configured to periodically move the funnel 814 along the series of tracks for the sole purpose of removing any potentially built-up debris. A movable funnel 814 may also have a telescoping intermediate channel 832 that communicates the lower contracted outlet 830 of the chute 826 with the top passages of the individual housings. With such a construction, when the funnel 814 is aligned with an opened top passage, the telescoping intermediate channel 832 may be expanded to extend through the opened top passage to provide a fully shielded passage for transfer of a container 200 between the funnel 814 and the inner space of the respective housing.

The storage station 800 also includes an actuator system 838 for interacting with a capture system 210 of a container 200. FIGS. 7a-7g and 8a-8g show one example of an actuator system 838 that includes a number of slats 840 positioned at the chute 826 of the funnel 814, on or within the walls of the chute 826. In this example, the slats 840 are moveable between a retracted position (as for example in FIG. 7a) and an extended position (as for example in FIG. 7c) in which the slats 840 interact with a container capture system 210. Preferably, when in the extended position and engaged with the container capture system 210, the slats 840 take the form of an extended funnel shape that guides a load-bearing element of a suspension system (e.g., a UAV or funnel suspension system) for reception in the capture system 210 of a container 200.

Figure 3A:
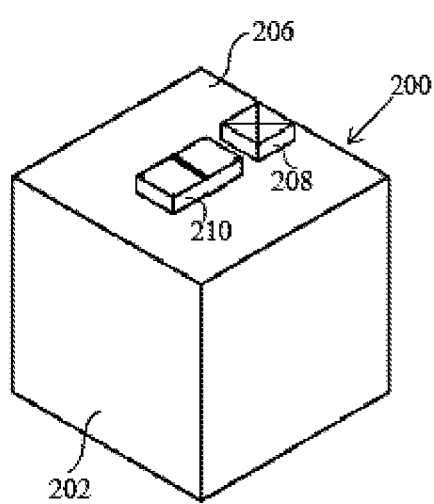
FIG. 3a shows a closed view of a reusable container for use with a storage unit station according to the present invention.
Figure 3B:
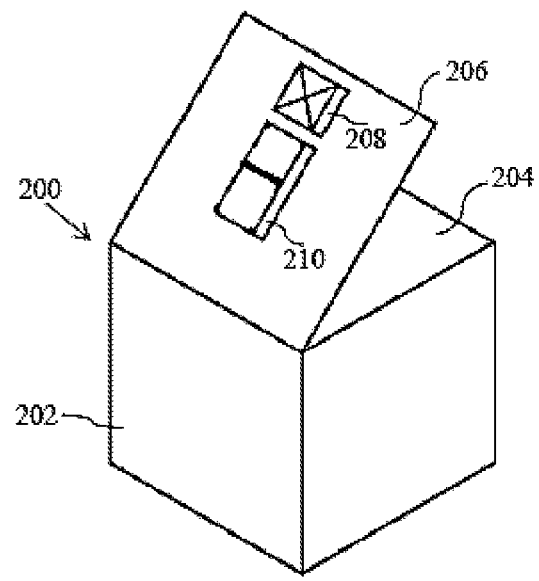

FIGS. 3a and 3b show one example of a reusable container 200 that may be transferred to and stored in a storage station 800. The container 200 includes a shell 202 that defines an inner space 204 for receiving one or more packages for delivery to a customer; and having one or more flaps 206 for opening and closing the shell 202. Preferably, a lock 208 is provided on the shell 202 for releasably securing the flap(s) 206. A capture system 210 is provided on a top outer surface of the shell 202 for engaging with a suspension system (e.g., a UAV or funnel suspension system). Though in the example in FIGS. 3a and 3b the top outer surface of the shell 202 is one in the same with the flap 206, in other examples the flap 206 may be positioned on a surface separate from the top surface on which the capture system 210 is provided. The container 200 may include a positioning system (GPS) tracker for use in tracking the container 200 along its delivery route, and a battery or other power source for powering the GPS tracker.

Figure 3C:
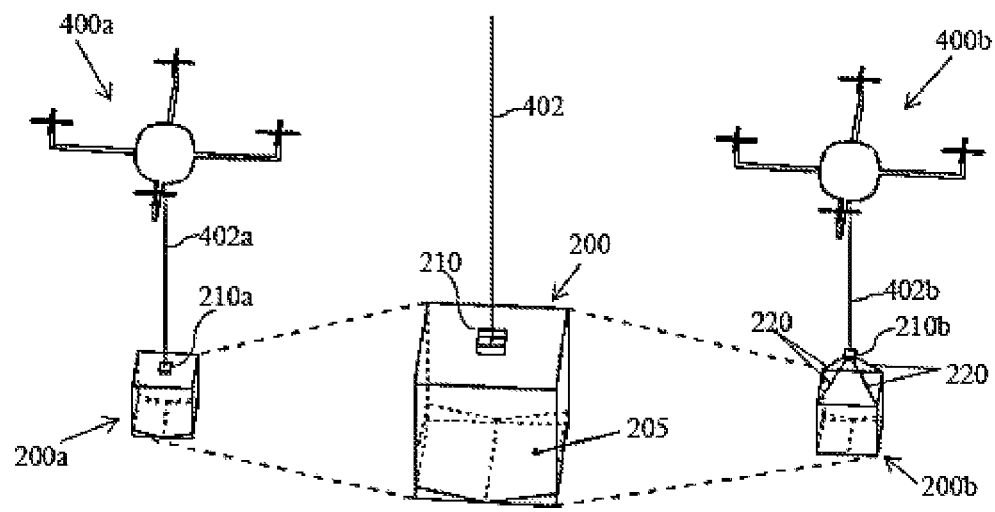
FIG. 3c shows stability enhancing constructions for a reusable container according to FIGS. 3a and 3b.

It is preferable the container 200 be configured to promote a stabilized transport thereof, so as to suppress the movement of the contents within the container 200 during vertical pickup and horizontal transport thereof. FIG. 3c illustrates two examples for achieving such a configuration. In both examples, the containers 200 (e.g., containers 200a/200b) may be constructed with an internal bottom surface 205 that is sloped, tapered, or otherwise downwardly funneled toward a centralized location of the inner space 204 that aligns with a central axis of the container 200. In this way, there is promoted a centralized positioning of contents within the inner space 204, which is expected to both suppress movement of contents and promote a symmetrical distribution of the weight of the container 200.

Stability of the containers 200 (e.g., containers 200a/200b) may be further enhanced by centralizing the point of connection between a suspension system and the container 200 (via a capture mechanism 210). In one example, as shown in FIG. 3c, the point of connection between a UAV 400a and a container 200a may be centralized by positioning the capture system shell 212 at a point on a top surface of the container 200a that aligns with the central axis of the container 200a. In another example, as also shown in FIG. 3c, the point of connection between a UAV 400b and a container 200b may be centralized by using a capture system 210b that includes a capture system shell 212 that is not attached to a surface of the container 200b, but which includes retractable cables 220 that extend between the capture system shell 212 and the top corners of the container shell 202. In the example shown in FIG. 3c the container 200b is square shaped with four corners and four cables 220; though it will be appreciated that the container 200b may have any number of corners with any number of corresponding cables 220. The retractable cables 220 may be biased toward a retracted state within the container 200b, in which state the tension in the cables 220 act with equal force to bias the capture system shell 212 toward a point on a top surface of the container 200b that aligns with the central axis of the container 200b. When the container 200b is supported by a UAV cable 402b, the retractable cables 220 may extend under the weight of the container 200b, with the capture system shell 212 lifting upwardly and away from the top surface of the container 200b. When extended, the retractable cables 220 equally distribute the weight of the container 200b such that the vertically displaced capture system shell 212 remains aligned with the central axis of the container 200b.

Though the examples illustrated in FIG. 3c depict the containers 200a/200b being suspended by a suspension system of a UAV 400, the containers 200a/200b may be suspended in a similar fashion by a funnel suspension system in a downward funnel 814 of a storage station 800.

FIGS. 4a-4e and 5a-5f show one example of a capture system 210 for use with a reusable container 200, in the form of a clamping mechanism, as well methods of delivering (FIGS. 4a-4e) and picking-up (FIGS. 5a-5f) a container 200 having such a capture system 210. The capture system 210 is provided on an outer surface of a shell 202 of a container 200 and includes a casing 212 having one or more panels 214 for accessing a capture space 216 that is separate from an inner space 204 of the container 200. The panels 214 are biased to a closed position (as in FIG. 4a) by one or more biasing elements 218. In use, a container 200 may be transferred between a holding bay of the UAV 400 or a funnel 814 and a holding space 852 of the elevator platform 850 of a storage station 800 via a UAV or funnel suspension system. In one example, a UAV suspension includes an extendable and retractable cable 402 having a load-bearing element 404 at an end thereof, the load-bearing element 404 being dimensioned for reception and entrapment within the capture space 216 of the capture system 210 when the panels 214 are in the closed position (as in FIG. 4a). In another example, a funnel suspension system includes an extendable arm 858 and an extendable and retractable cable 860 having a load-bearing element 862 at an end thereof. The extendable arm 858 is moveable between a stowed position in which the extendable arm 858 is stored in a manner to prevent any obstruction to a UAV suspension system from transferring a container 200 into or out of the storage station 800, and an extended position in which the extendable arm 858 is positioned to align the load-bearing element 862 for engagement with a capture system 210 of a container 200 that is positioned in the holding space 852 of the elevator platform 850.

Non-limiting examples of biasing elements 218, for biasing the panels 214 of the container capture system 210 to the closed position, may include springs, magnets, electric motors, and combinations thereof. In some examples the biasing elements 218 may be of a purely mechanical type, such that the capture system 210 may operate without an electrical energy supply. The load-bearing elements 404/862 may be formed of metal, plastic, or any other material that keeps shape under pressure; with the body being a spherical shape or any other preferred shape (e.g., cube, rectangular prism, triangular prism, spiked sphere, etc.).

As shown in FIGS. 4a-4e, when a container 200 is transferred into a storage station 800 from a UAV 400 (e.g., in a UAV drop-off transfer), the UAV 400 will extend the retractable cable 402 to lower the container 200 through the downward funnel 814, the funnel 814 acting to guide the container 200 to the holding space 852 of the elevator platform 850 in the storage station 800. After the container 200 is positioned in the holding space 852 of the elevator platform 850 (as in FIG. 4a), the slats 840 of the actuator system 838 are activated to extend and press against the panels 214 of the capture system 210 with sufficient force to move the panels 214 to an open position (as in FIG. 4b). The UAV 400 then retracts the cable 402 to remove the load-bearing element 404 from the capture space 216 of the capture system 210 (as in FIG. 4c), after which the slats 840 are retracted (as in FIG. 4d) thereby allowing the biasing elements 218 to return the panels 214 to the closed position (as in FIG. 4e). Though the example illustrated in FIGS. 4a-4e depicts the operation of the capture system 210 and actuator system 838 during a drop-off transfer of a container 200 from a suspension system of a UAV 400, it will be appreciated that the capture system 210 and actuator system 838 operate in a similar manner during a drop-off transfer of a container 200 from a suspension system of a downward funnel 814 (e.g., an inter-station drop-off or storage transfer).

Figure 5A:
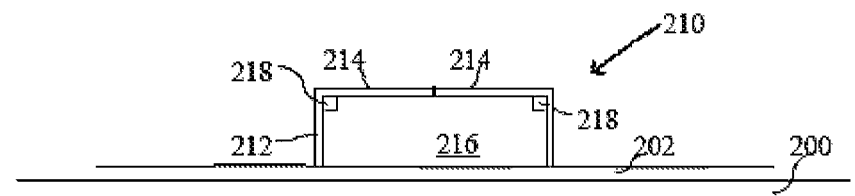
FIGS. 5a-5f show the interaction of a load-bearing element of a suspension system and a capture system of a reusable container in performing a pick-up transfer of a container according to the present invention.
Figure 5B:
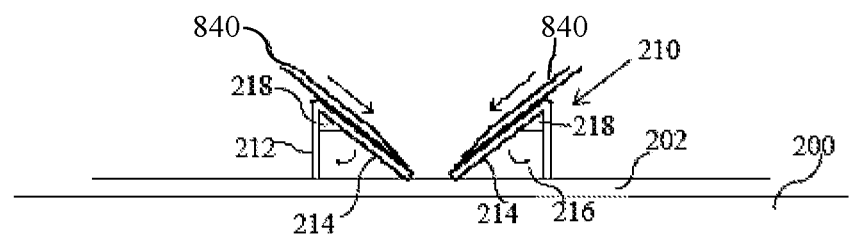
Figure 5C:
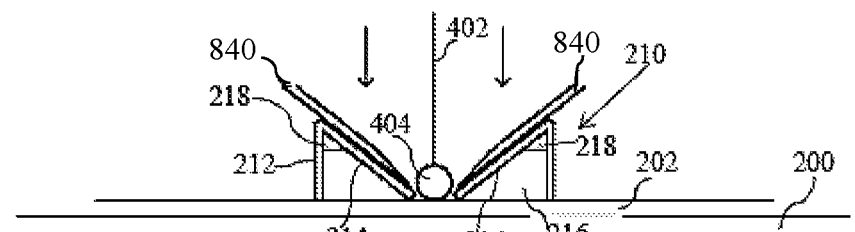
Figure 5D:
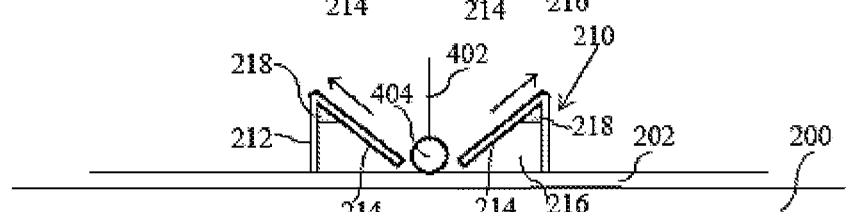
Figure 5E:
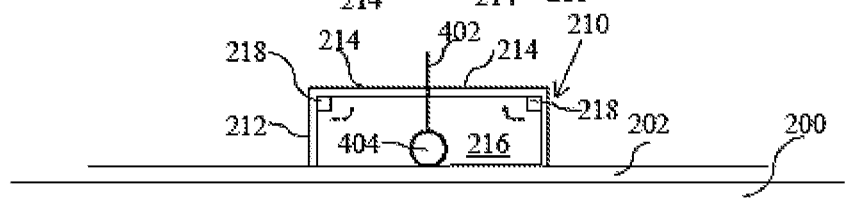

As shown in FIGS. 5a-5f, when a container 200 is being transferred from a storage station 800 to a UAV 400 (e.g., a UAV pick-up transfer), after positioning the elevator platform 850 at the predetermined loading position that aligns the holding space 852 with the top passage 812 and the capture system 210 with the actuator system 838 (as in FIG. 5a), the slats 840 of the actuator system 838 are activated to extend and press against the panels 214 of the capture system 210 with sufficient force to move the panels 214 to an open position (as in FIG. 5b), and the load-bearing element 404 is then lowered into the capture space 216 (as in FIG. 5c). The slats 840 are then retracted (as in FIG. 5d) thereby allowing biasing elements 218 to return the panels 214 to the closed position, entrapping the load-bearing element 404 within the capture space 216 (as in FIG. 5e). The cable 402 is then retracted causing the load-bearing element 404 to abut against the inner surface of the closed panels 214 (as in FIG. 5f), and thereby lifting the container 200 from the holding space 852 of the elevator platform 850 and into the holding bay of the UAV 400. Though the example illustrated in FIGS. 5a-5e depicts the operation of the capture system 210 and actuator system 838 during a pick-up transfer of a container 200 by a suspension system of a UAV 400, it will be appreciated that the capture system 210 and actuator system 838 operate in a similar manner during a pick-up transfer of a container 200 by a suspension system of a downward funnel 814 (e.g., an inter-station pick-up or transport transfer).

It will be appreciated that the capture system 210 is not limited to the example shown in FIGS. 4a-4e and 5a-5f; and that the capture system 210 may take any number of forms. Non-limiting examples of capture systems may include a clamping mechanism such as that shown in FIGS. 4a-4e and 5a-5f; a magnetic (or electromagnetic) mechanism, a hook mechanism, a Velcro® mechanism, or combination thereof.

The container 200 may be made with any given dimensions, provided the holding space 852 of the elevator platform 850 and the holding bay of the UAV 400 and downward funnel 814 can be constructed with corresponding dimensions for receiving the container 200, and provided the storage station 800 may likewise be constructed with corresponding dimensions for handling the container 200.

The storage station 800 may serve the purpose to store additional containers 200. Throughout daily operations there may be a need to dispatch an empty container 200 from the storage station 800, or a need to deposit a container 200 into the storage station 800. It is preferable the systems and methods for interaction of the actuator system 838 of the storage station 800 and the capture system 210 of the container 200 be substantially identical to the systems and methods for interaction of the actuator system 138 of a transfer station 100 and the capture system 210 of the container 200.

The housing 802 may be made of any material that is weather resistant. Non-limiting examples of materials suitable for constructing the housing 802 include metal, plastic, wood, glass, fiber glass, carbon fiber, and combinations thereof. The funnels 814/816 (which may include the slats 840) may be made of any of the same materials, or combinations of materials, that are suitable for the housing 802, though with the further consideration that the funnels 814/816 must be constructed to withstand the weight and forces incurred by the sliding of a container 200 therealong. The track 834 may likewise be made of any of the same materials, or combinations of materials, that are suitable for the housing 802, though with the further consideration that the track 834 must be constructed to withstand the weight and movement of the funnel 814 therealong, as well as the additional weight and forces incurred when a reusable container 200 passes through the funnel 814.

The side doors 806 and top hatch 810 may be made of any closure structure. Non-limiting examples of closure structures that may be used for the side doors 806 and/or top hatch 810 include a single panel or object closure (e.g., a moving plate), a multiple panel or object closure (e.g., a series of hinged panels, or a series of plates or bars), and combinations thereof. The panel(s) and/or object(s) making up the side doors 806 and top hatch 810 may be made of any material offering a suitable degree of protection and durability. In some examples, the storage unit station 800 may omit side doors 806 and/or a top hatch 810, such that the side and/or top passages 808/812 are always in an open state.

Figure 6:
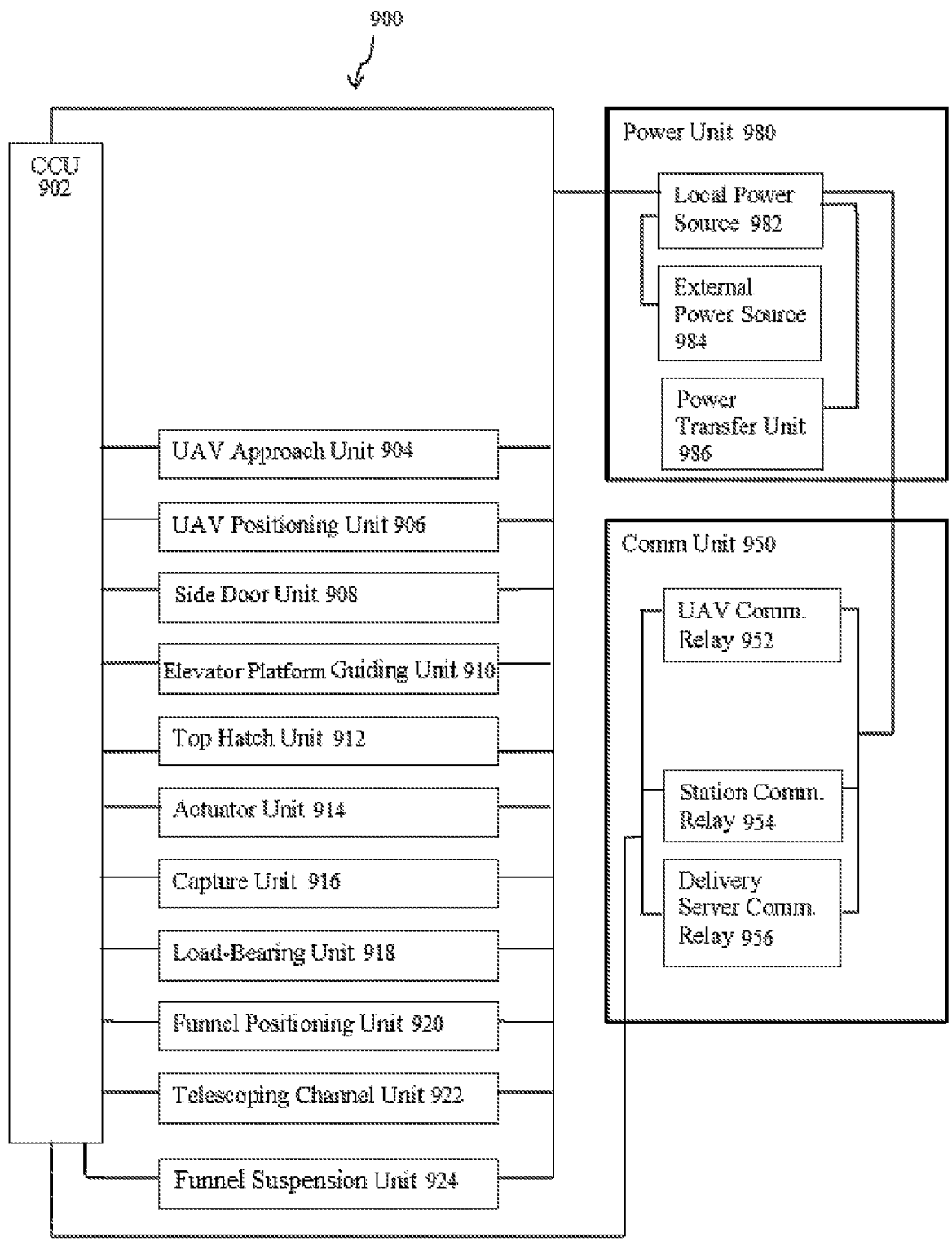
FIG. 6 shows a schematic of a control system of the storage station according to FIGS. 1a-1b.

FIG. 6 shows one example of a control system 900 for a storage station 800 according to the present invention. The control system 900 includes a central control unit (CCU) 902 that interfaces with several components to effect operation of the storage station 800.

A UAV approach unit 904 may include one or more UAV approach sensors for detecting the approach of a UAV 400 relative to the storage station 800, and for outputting a signal to the CCU 902 indicating that a UAV 400 is approaching the storage station 800. Non-limiting examples of suitable UAV approach sensors may include sonar, laser, RFID, and combinations thereof.

A UAV positioning unit 906 may include one or more UAV positioning sensors for determining whether a UAV 400 is at a sufficient vertical position above the storage station 800 for aligning a holding bay of the UAV 400 with the upper enlarged inlet 828 of the funnel 814, and for outputting a signal to the CCU 902 indicating positioning of the UAV 400, which may include positioning information indicating whether the UAV 400 is sufficiently positioned to align the holding bay of the UAV 400 with the upper enlarged inlet 828 of the funnel 814, and/or localized positioning data indicating relative positioning of the holding bay of the UAV 400 in relation to the upper enlarged inlet 828 of the funnel 814. Non-limiting examples of suitable UAV positioning sensors may include image sensors, light sensors, infrared sensors, distance sensors, and combinations thereof. In one example, image sensors may continuously relay positioning information between a storage station 800 and a UAV 400 indicating any correction needed for aligning a container 200 with the funnel 814 and/or the top passage 812. Such an image sensor may recognize key orientation points on the container 200, which information may then be used to instruct the UAV 400 to rotate as needed to achieve alignment of the container 200 with the funnel 814 and/or the top passage 812. In some examples, light, infrared, and/or distance sensors may be used to monitor vertical distance between the container 200 and the storage station 800; and such information may be used to transmit instructions for correcting the altitude of the UAV 400 and/or the container 200.

A side door unit 908 may include one or more side door motors that receive signals from the CCU 902 for the opening and closing of the side doors 806. A side door unit 908 may also include one or more side door sensors that detect positioning of a side door 806 (e.g., opened, closed, or intermediate positions thereof), and/or which may detect the presence of an obstruction in the movement path of a side door 806 (e.g., a container, a bystander, wildlife, etc.); and which output signals to the CCU 902 indicating the positioning of a side door 806 and/or an obstruction state of the movement path of a side door 806 (e.g., obstructed, not obstructed). Non-limiting examples of suitable side door sensors may include touch sensors, pressure sensors, ultrasonic sensors, infrared sensors, and combinations thereof.

An elevator platform guiding unit 910 may include one or more guiding motors for engaging the elevator platform 850 and for driving automated conveyor belts 854 on the elevator platform 850 and/or the storage compartments 856 to move containers 200, and which receive signals from the CCU 902 instructing engagement of a container 200 and/or movement of an engaged container 200 via the automated conveyor belts 854. The elevator platform guiding unit 910 may also include one or more load sensors for detecting the presence or absence of a container 200 on the elevator platform 850 and in the storage compartments 856, and for outputting signals to the CCU 902 conveying a load state of the elevator platform 850 and the storage compartments 856 (e.g., available to receive a container 200, and/or available to give a container 200); and may further include one or more guiding sensors for detecting the location and positional data of the elevator platform 850 and/or the presence of a container 200 within proximity for engagement by the conveyor belts 854, and for outputting signals to the CCU 902 indicating the position of an elevator platform 850 and/or that a container 200 is in proximity for engagement by the conveyor belts 854. Non-limiting examples of suitable load sensors may include touch sensors, pressure sensors, ultrasonic sensors, light or infrared sensors, and combinations thereof. Non-limiting examples of suitable guiding sensors may include touch sensors, pressure sensors, ultrasonic sensors, infrared sensors, and combinations thereof.

A top hatch unit 912 may include one or more top hatch motors that receive signals from the CCU 902 instructing opening and closing of the top hatch 810. The top hatch unit 912 may also include one or more top hatch sensors that detect positioning of the top hatch 810 (e.g., opened, closed, or intermediate positions thereof), and/or which may detect the presence of an obstruction in the movement path of the top hatch 810 (e.g., a UAV suspension system, a funnel suspension system, a container, an actuator mechanism, etc.); and which output signals to the CCU 902 indicating the positioning of the top hatch 810 and/or an obstruction state of the movement path of the top hatch 810 (e.g., obstructed, not obstructed). Non-limiting examples of suitable top hatch sensors may include touch sensors, pressure sensors, ultrasonic sensors, infrared sensors, and combinations thereof.

An actuator unit 914 may include one or more actuator motors that receive signals from the CCU 902 instructing extension and retraction of the slats 840. The actuator unit 914 may also include one or more actuator sensors that detect positioning of the slats 840 (e.g., extended, retracted, or intermediate positions thereof), and/or which may detect the presence of an obstruction in the movement path of the slats 840 (e.g., a UAV suspension system, a funnel suspension system, a container, accumulated snow, etc.); and which output signals to the CCU 902 indicating the positioning of the slats 840 and/or an obstruction state of the movement path of the slats 840 (e.g., obstructed, not obstructed). Non-limiting examples of suitable actuator sensors may include touch sensors, pressure sensors, ultrasonic sensors, infrared sensors, and combinations thereof.

A capture unit 916 may include one or more capture sensors that determine whether the slats 840 of the actuator system 838 have engaged the capture system 210 of the container 200; and which output signals to the CCU 902 indicating whether the slats 840 have engaged the capture system 210 of the container 200. Non-limiting examples of suitable capture sensors may include touch sensors, pressure sensors, ultrasonic sensors, infrared sensors, contact sensors at the engaging ends of the slats, force-feedback sensors at the base ends of the slats, and combinations thereof.

A load-bearing unit 918 may include one or more load-bearing sensors that detect the presence of a load-bearing element (e.g., a loading-bearing element 404 of a UAV suspension system; a load-bearing element 862 of a funnel suspension system) within the capture space 216 of the capture system 210 of a container 200; and which output signals to the CCU 902 indicating the presence or absence of a load-bearing element within the capture space 216. Non-limiting examples of suitable load-bearing sensors may include light sensors or infrared sensors on the slats detecting the passing of the load-bearing element within the capture space, proximity sensors at the engaging ends of the slats 840, an RFID sensor at the engaging ends of the slats 840 for communicating with an RFID tag in the load-bearing element, and combinations thereof.

In examples where the funnel 814 is mounted movably on a track 834, such as when the storage station 800 is part of a multi-unit station 800' (as in FIG. 9), the control system 900 may include a funnel position unit 920. A funnel position unit 920 may include one or more funnel position motors that receive signals from the CCU 902 instructing movement of the funnel 814 along the tracks 834/134 at the top of the housing 802. The funnel position unit 920 may also include one or more funnel position sensors that detect positioning of the funnel 814, including whether the funnel 814 is positioned to align the lower contracted outlet 830 with the top passage 812 (top hatch 810) of the housing 802, and/or which may detect the presence of an obstruction in the movement path of the funnel 814 along the track 834 (e.g., accumulated snow, etc.); and which output signals to the CCU 902 indicating the positioning of the funnel 814 and/or an obstruction state of the movement path of the funnel 814 (e.g., obstructed, not obstructed). Non-limiting examples of suitable funnel position sensors may include touch sensors, light sensors, pressure sensors, ultrasonic sensors, infrared sensors, and combinations thereof.

In examples where the funnel 814 includes a telescoping intermediate channel 832, the control system 900 may include a telescoping channel unit 922. A telescoping channel unit 922 may include one or more telescoping channel motors that receive signals from the CCU 902 instructing extension and retraction of the telescoping channel 832. The telescoping channel unit 922 may also include one or more telescoping channel sensors that detect positioning of the telescoping channel 832 (e.g., fully extended, fully retracted, and/or intermediate positions thereof), and/or which may detect the presence of an obstruction in the movement path of the telescoping channel 832 (e.g., a closed top hatch, etc.); and which output signals to the CCU 902 indicating the positioning of the telescoping channel 832 and/or an obstruction state of the movement path of the telescoping channel 832 (e.g., obstructed, not obstructed). Non-limiting examples of suitable telescoping channel sensors may include touch sensors, distance sensors, pressure sensors, ultrasonic sensors, infrared sensors, and combinations thereof.

A funnel suspension unit 924 may include one or more extendable arm motors that receive signals from the CCU 902 instructing extension and retraction of the extendable arm 858 between the stowed and extended positions; and one or more retractable cable motors that receive signals from the CCU 902 instructing extension and retraction of the retractable cable 860. The funnel suspension unit 924 may also include one or more arm sensors that detect positioning of the extendable arm 858 (e.g., fully extended, fully retracted, and/or intermediate positions thereof), and/or which may detect the presence of an obstruction in the movement path of the extendable arm 858 (e.g., an obstruction within the funnel 814); and which output signals to the CCU 902 indicating the positioning of the extendable arm 858 and/or an obstruction state of the movement path of the extendable arm 858 (e.g., obstructed, not obstructed). The funnel suspension unit 924 may also include one or more cable sensors that detect positioning of the retractable cable 860 (e.g., fully extended, fully retracted, and/or intermediate positions thereof), and/or which may detect the presence of an obstruction in the movement path of the retractable cable 860 (e.g., an obstruction within the funnel 814, closure of the top hatch 810, etc.); and which output signals to the CCU 902 indicating the positioning of the retractable cable 860 and/or an obstruction state of the movement path of the retractable cable 860 (e.g., obstructed, not obstructed). Non-limiting examples of suitable arm sensors and cable sensors may include touch sensors, distance sensors, pressure sensors, ultrasonic sensors, infrared sensors, and combinations thereof.

Though the example in FIG. 6 shows the funnel-units (e.g., the actuator unit 914; the capture unit 916; the load-bearing unit 918; the funnel positioning unit 920; the telescoping channel unit 922; and the funnel suspension unit 924) being in communication with the CCU 902 of the storage station 800 (e.g., each in wireless communication via a first transceiver at each respective funnel-unit and corresponding second transceivers at the CCU 902), it is understood that each funnel-unit may also be in communication with one or more other control systems. For example, in a multi-unit station 800' formed from multiple modular stations, each funnel-unit may communicate wirelessly with a control system in each individual modular station and/or may communicate wirelessly with a single control system that manages all operations among each of the engaged modular stations.

A communications unit 950 may include a UAV communications relay 952 that establishes communications between the CCU 902 and UAVs 400 in proximity of the storage station 800; a station communications relay 954 that establishes communications between the CCU 902 and other nearby storage stations 800 and/or transfer stations 100; and/or a delivery server communications relay 956 that establishes communications between the CCU 902 and a delivery server.

A UAV communications relay 952 may transmit data between the CCU 902 and one or more nearby UAVs 400 conveying load states of the UAVs 400 (e.g., available to receive a container 200, and/or available to give a container 200); delivery statuses of the UAVs 400 (e.g., seeking a UAV drop-off transfer or a UAV pick-up transfer); and/or positional data informing the relative positions of the UAVs 400 (e.g., as being sufficiently positioned to align the holding bay of the UAV 400 with the upper enlarged inlet 828 of the funnel 814; and/or localized positioning data indicating relative positioning of the holding bay of the UAV 400 in relation to the upper enlarged inlet 828 of the funnel 814).

A station communications relay 954 may transmit data between the CCU 902 and one or more nearby storage stations 800 and/or transfer stations 100 for conveying a status of the nearby stations (e.g., a number of containers 200 in a nearby storage station; whether a UGV 300 is housed in a nearby transfer station; a load state of a UGV 300 housed in a nearby transfer station; etc.). In examples where the storage station 800 is part of a multi-unit station, the station communications relay 954 may transmit data between the CCU 902 and the central control units of the one or more engaged storage stations and/or transfer stations for coordinating movement of a shared funnel 814 along the aligned tracks of the individual stations. It is noted that a multi-unit station 800', such as that shown in FIG. 9, that includes a storage station 800 according to the present invention together with a transfer station 100 according to U.S. Ser. No. 15/416,639, such as that shown in FIGS. 10a-10b, will preferably have a downward funnel 814, as disclosed herein, such that the multi-unit station 800' may be provided with a funnel suspension system for conveying containers 200 between the storage station 800 and the transfer station 100.

In some examples the storage station 800 may be part of a larger delivery network in which one or more delivery servers may oversee the delivery operations within a given geographical region by, for example, the flight routes of UAVs 400, the loading and transferring schedules of storage stations 800 and transfer stations 100 within a given region, and the vacancy and/or capacity of storage station's 800 within a given region. In such an example, a delivery server communications relay 956 may transmit data between the CCU 902 and one or more delivery servers to update the status of the storage station 800 with the one or more delivery servers (e.g. the storage state of a storage station 800; the location and load state of a UGV 300; the availability of empty/replacement containers 200 for delivery to a storage station 800 or a transfer station 100; etc.).

A power supply unit 980 for powering the control system 900 may include a local power source 982 (e.g., a replaceable and/or rechargeable battery; a fuel-based power source; etc.) that powers the CCU 902 as well as any other components of the control system 900 that require electrical power to operate. Optionally, the power supply unit 980 may communicate with one or more external power sources 984 for charging the local power source 982. Non-limiting examples of external power sources 984 may include solar panels, wind turbines, hydro turbines, kinetic energy transducers (e.g., for vibration energy conversion), electrical energy grids, fossil-fuel power sources, and combinations thereof. The storage station 800 may be constructed in any suitable place for making use of the chosen power source— e.g., at an area of unobstructed sunlight for extracting solar energy; at an area of prominent wind flow for extracting wind energy from wind turbines; near a waterway to extract hydro energy from hydroelectric turbines; etc.

A power transfer unit 986 may be provided for establishing an electrical communication for transferring electrical energy between the power supply unit 980 and an on-board power source of a container 200 such that the local power source 982 may charge a power source of the container 200. In some examples, the power transfer unit 986 may permit the container 200 to recharge the local power source 982 as a back-up redundancy to one or more external power sources 984 that serve as the primary power delivery of electrical power for the local power source 982. Preferably, the power transfer unit 986 takes the form of a pair of mating electrical connections, with one connection provided at the storage station 800 and the other mating connections provided on containers 200. Non-limiting examples of mating electrical connections that may be included in the power transfer unit 986 include one or more mating electrical sockets and plugs, one or more mating electrical plates, and combinations thereof.

In some examples the power transfer unit 986 may be exposed for engagement by a container 200 without any advance electrical power requirement by the storage station 800, and the power source of the container 200 (upon engaging the power transfer unit 986) may serve as the sole power source for operation of the storage station 800, without requiring a local power source 982 within the housing 802. For example, the storage station 800 may be constructed without any top hatch 810, such that a container 200 may be lowered directly onto an elevator platform 850 that is by default stored in the predetermined position for receiving a container 200, and there may be provided on the elevator platform 850 itself a suitable electrical connection for engaging a mating electrical connection on a container 200 that is received on the elevator platform 850. There may also be provided electrical connections in each storage compartment 856 that are suitably positioned for engaging mating electrical connections on a container 200 that is inserted into a storage compartment, such that each container 200 stored in any storage compartment 856 may serve as a separate power source for the storage station 800.

In some examples, such as when the storage station 800 is a modular station in a multi-unit station 800', the power transfer unit 986 may include an electrical connection for mating with a corresponding electrical connection in a power supply unit 700 of an engaged transfer station 100, and/or the power transfer unit of another engaged storage station.

The local power source 982 may deliver electrical power to the CCU 902, and the several further components of the control system 900, via one or more electrical lines. In examples where the storage station 800 includes a movable funnel 814 mounted on a track 834 atop the housing 802, such as when the storage station 800 is part of a multi-unit station 800', the track 834 may be constructed to transfer electrical power to any components located on the movable funnel 814 (e.g., funnel motors, sensors, and/or receivers; actuator motors, sensors and/or receivers; etc.) via an electrical connection between the track 834 and the movable funnel 814. For example, the track 834 may include an electrical rail and the movable funnel 814 may include one or more electrical slip brushes that establish an electrical connection with the electrical rail.

It will be appreciated that the control system 900 shown in FIG. 6 is one example of a control system 900 that may be used with the present invention, and that a suitable control system 900 for use with the invention may have a number of variations.

In some control systems 900, multiple individual units may be replaced by a single unit that performs all the functions of the multiple individual units. For example, there may be provided a single UAV coordination unit that is capable of precisely monitoring the location and positioning of a UAV 400 so as to perform the functions of both the UAV approach unit 904 and the UAV positioning unit 906.

In some control systems 900, a single communications relay may be capable of transmitting sufficiently detailed data from an outside source (e.g., a delivery server; a global positioning system; etc.) such that the data provided by the single communication relay permits the omission of one or more units. For example, if the UAV communications relay 952 is capable of transmitting sufficiently detailed positioning information and/or load information from an internal system of a UAV 400 itself then a control system 900 may omit the UAV approach unit 904 and the UAV positioning unit 906.

In operation, a storage station 800 according to the present invention may be used to transfer a reusable container 200 from a UAV 400 to an elevator platform 850 (a UAV drop-off transfer), to transfer reusable a container 200 from an elevator platform 850 to a UAV 400 (a UAV pick-up transfer). The storage station 800 may also be used with a transfer station 100 to transfer a reusable container 200 from a UGV 300 to the storage station 800 (an inter-station transport transfer), as shown in FIGS. 12a-12k, and to transfer a reusable container 200 from the storage station 800 to a UGV 300 (an inter-station storage transfer), as shown in FIGS. 13a-13k. Such transfers may be managed by one or more delivery servers.

When a delivery server determines that a storage station 800 has a storage compartment 856 available to receive a reusable container 200, the delivery server outputs a signal instructing a container-carrying UAV 400 to travel to the storage station 800 to transfer the container 200 to the elevator platform 850 (i.e., a UAV drop-off transfer). FIGS. 4a-4e and 7a-7g show one example of operations that may be performed in a UAV drop-off transfer.

Upon detecting the UAV 400 within a predetermined proximity of the storage station 800, the UAV approach unit 904 outputs a signal to the CCU 902 indicating approach of the UAV 400. If the storage station 800 is provided as one unit in a multi-unit station 800', then following reception of the signal indicating approach of a UAV 400, the CCU 902 will output a signal to the funnel positioning unit 920 instructing the funnel 814 to move along the tracks 134/834 as needed to align with the top hatch 810 of the storage station 800. Depending on the movement system employed by the funnel positioning unit 920, the CCU 902 may also communicate with one or more other stations in the multi-unit station 800' via the station communications relay 954 to coordinate movement of the funnel 814. Once the funnel 814 is aligned with the top hatch 810, the funnel positioning unit 920 will output a signal to the CCU 902 confirming funnel alignment.

Upon arriving vertically above the storage station 800, the UAV 400 may output a signal to the CCU 902 via the UAV communications relay 952 indicating the UAV 400 is above the storage station 800. At this time, a UAV positioning unit 906 may determine whether the UAV 400 is positioned at an appropriate vertical position above the storage station 800 to align a holding bay of the UAV 400 with the upper enlarged inlet 828 of the funnel 814, and output a signal to the CCU 902 indicating whether the UAV 400 is positioned in such vertical alignment with the funnel 814. If it is determined that the UAV 400 is not positioned to vertically align with the funnel 814, then the CCU 902 may coordinate with the UAV 400 via the UAV communications relay 952 to assist the UAV 400 in navigating to a proper position for alignment while the UAV positioning unit 906 continues to monitor the positioning of the UAV 400 and update the CCU 902 as to positional alignment of the UAV 400 with the funnel 814.

Upon confirming alignment of a holding bay of the UAV 400 with the upper enlarged inlet 828 of the funnel 814, the CCU 902 then outputs a signal to the top hatch unit 912 instructing opening of the top hatch 810. In examples where the funnel 814 includes a telescoping intermediate channel 832, the CCU 902 also outputs a signal to the telescoping channel unit 922 instructing extension of the telescoping channel 832 through the opened top passage 812.

Figure 7:
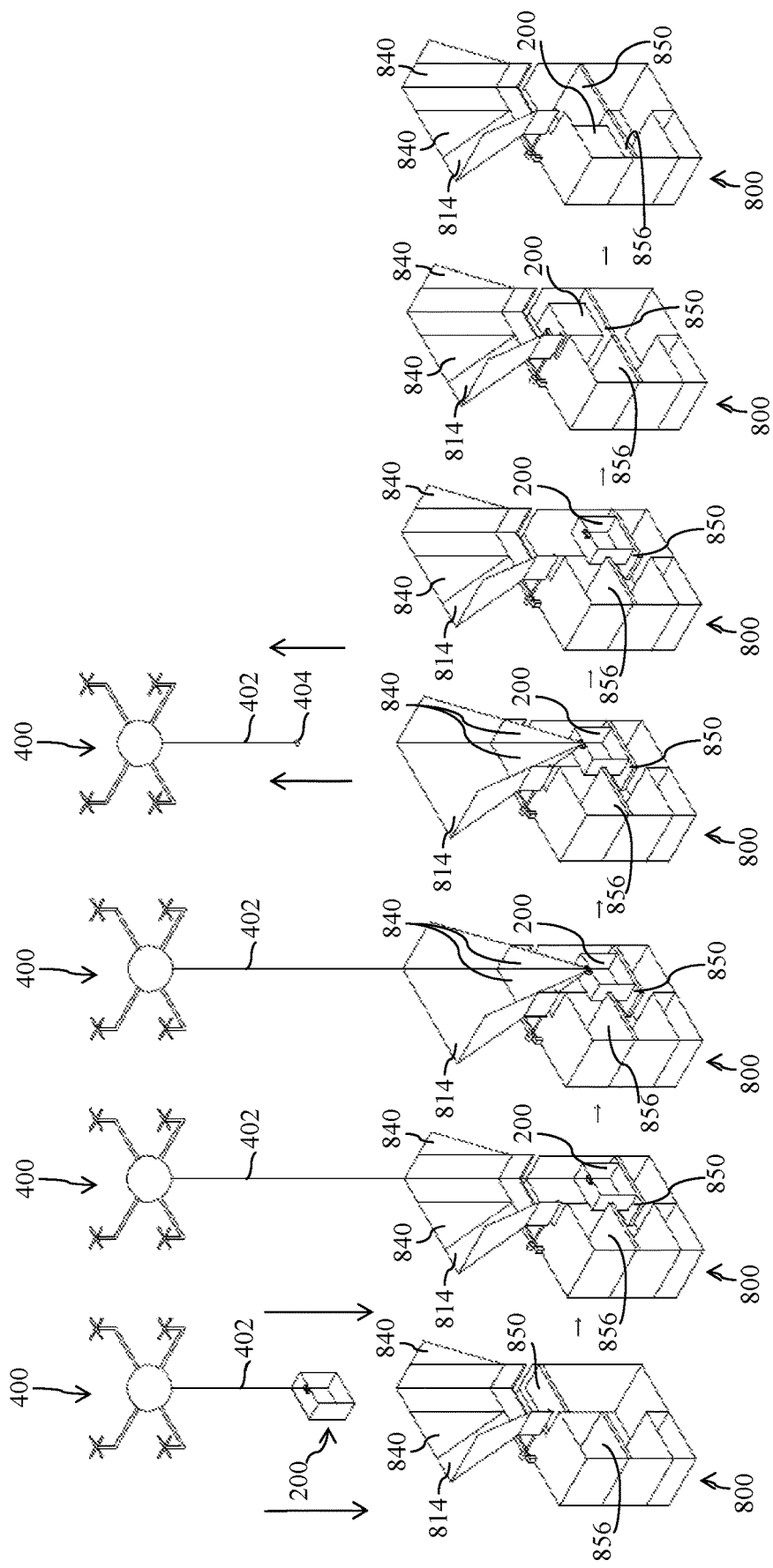
FIGS. 7a-7g show a UAV drop-off transfer of a container according to the present invention.

The CCU 902 then instructs the UAV communications relay 952 to output a signal to the UAV 400 indicating that the top hatch 810 is open (as in FIG. 7a). The UAV 400 then activates a UAV suspension system to lower the retractable cable 402 supporting a reusable container 200 (as in FIG. 7a); the container 200 being supported on the cable 402 by entrapment of a load-bearing element 404 at the end of the cable 402 within a capture system 210 of the container 200 (as in FIG. 4a). As the cable 402 is lowered, the container 200 enters into the downwardly tapered funnel 814 through the upper enlarged inlet 828 and is guided through the chute 826 and out the lower contacted outlet 830, such that the container 200 is aligned both for entry through the opened top passage 812 of the housing 802 and reception within the holding space 852 of the elevator platform 850 (as in FIG. 7b).

Upon determining there has been a change in the load state of the elevator platform 850, the elevator platform guiding unit 910 outputs a signal to the CCU 902 indicating the container 200 has been received within the holding space 852 of the elevator platform 850. The CCU 902 then outputs a signal to the actuator unit 914 instructing extension of the slats 840 of the actuator system 838 to open the capture system 210 of the container 200 (as in FIG. 7c). Once the capture unit 916 determines the slats 840 have properly engaged with the capture system 210, the capture unit 916 then outputs a signal to the CCU 902 indicating that the capture system 210 is in an open state (as in FIG. 4b), and the CCU 902 then outputs a signal directing the UAV communications relay 952 to instruct the UAV 400 to retract the cable 402 (as in FIG. 7d), thereby removing the load-bearing element 404 from the capture system 210 of the container 200 (as in FIG. 4c). Upon determining the load-bearing element 404 has been removed from the capture space 216, the load-bearing unit 918 outputs a signal to the CCU 902 indicting the same, and the CCU 902 then outputs a signal instructing the actuator unit 914 to retract the slats 840 (as in FIGS. 7e and 4d), thereby allowing the capture system 210 of the container 200 to return to a closed position (as in FIG. 4e).

After the container 200 has been delivered to the elevator platform 850, and following closure of the capture system 210 after removal of the load-bearing element 404, the CCU 902 outputs a signal to the elevator platform guiding unit 910 instructing the elevator platform guiding system 818 to move the elevator platform 850 to align with an empty storage compartment 856 (as in FIG. 7f). Once the elevator platform 850 is aligned with the storage compartment 856, the CCU 902 then outputs a further signal to the elevator platform guiding unit 910 to activate conveyor belts 854 for inserting the container 200 into the aligned storage compartment 856 (as in FIG. 7g).

In examples where the funnel 814 includes a telescoping intermediate channel 832, the CCU 902 next outputs a signal to the telescoping channel unit 922 instructing retraction of the telescoping channel 832 from the opened top passage 812. The CCU 902 then outputs a signal instructing the top hatch unit 912 to close the top hatch 810. The CCU 902 may then output a signal directing the delivery server communications relay 956 to contact one or more delivery servers to update the load state of the storage station 800 and the UAV 400.

When a delivery server determines a storage station 800 is storing a container 200 that is ready for UAV pick-up, the delivery server outputs a signal instructing a UAV 400 that is available to receive a container 200 to travel to the storage station 800 to pick-up the reusable container 200 (i.e., a UAV pick-up transfer). FIGS. 5a-5f and 8a-8g show one example of operations that may be performed in a UAV pick-off transfer.

Detection of the approaching UAV 400, optional movement of a funnel 814 in a multi-unit station 800', confirmation of alignment between a holding bay of the UAV 400 and the funnel 814 of the storage station 800, opening of the top hatch 810 and extension of a telescoping intermediate channel 832 proceed in the same manner here as during a UAV drop-off transfer; and so a discussion is not repeated here.

Figure 8:
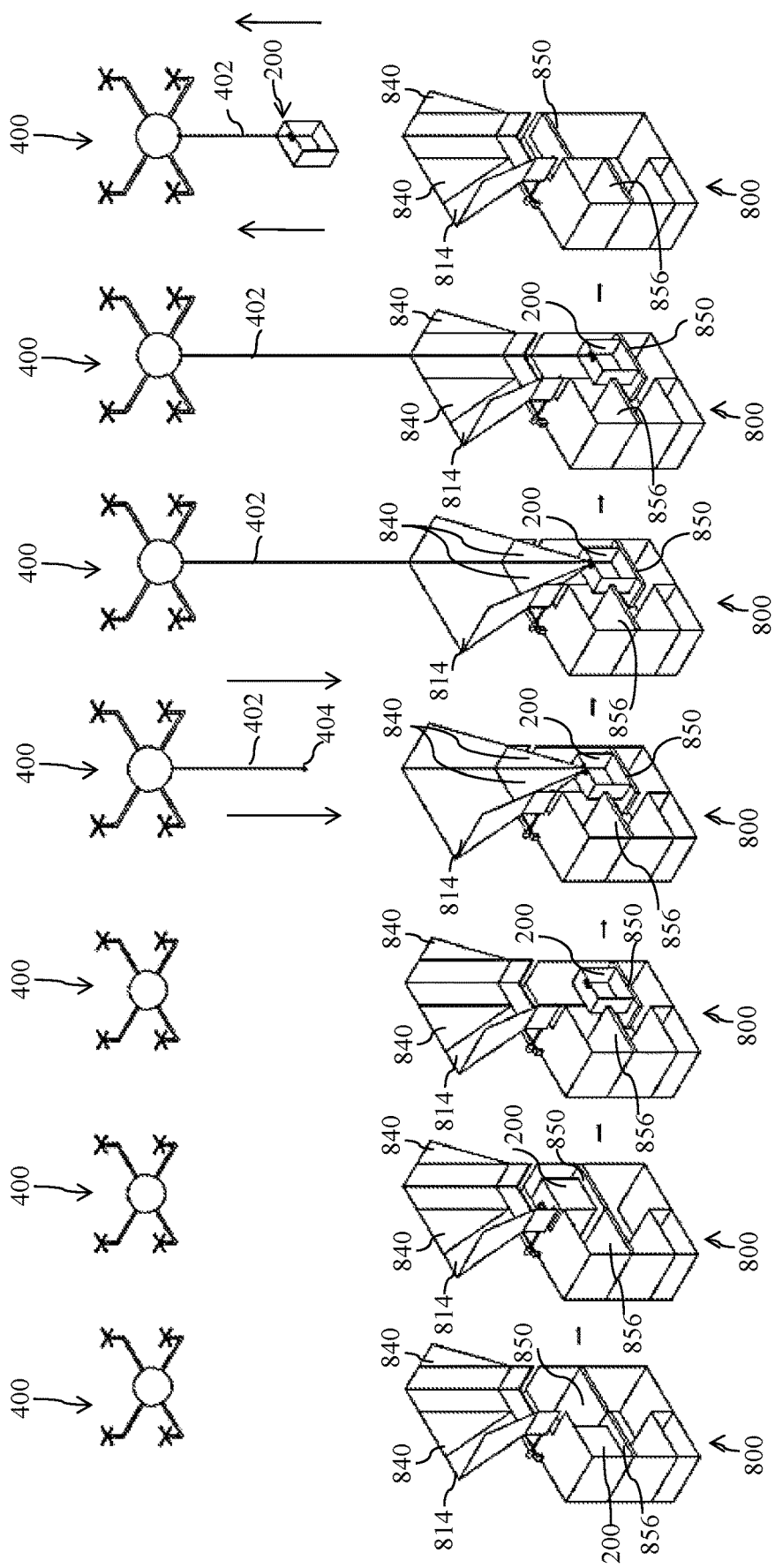
FIGS. 8a-8g show a UAV pick-up transfer of a container according to the present invention.

Once the UAV 400 is positioned for alignment above the storage station 800, and ready to receive a container 200, the CCU 902 outputs a signal to the elevator platform guiding unit 910 instructing the elevator platform guiding system 818 to move the elevator platform 850 to align with a storage compartment 856 that is holding a container 200 that is ready for pick-up by the UAV 400 (as in FIG. 8a). Once the elevator platform 850 is aligned with a designated storage compartment 856, the CCU 902 then outputs a further signal to the elevator platform guiding unit 910 to activate conveyor belts 854 for extracting the container 200 from the storage compartment 856 to the predetermined position 850 of the elevator platform 850 (as in FIG. 8b). Once the container 200 is at the holding space 852 of the elevator platform 850, the CCU 902 outputs a signal to the elevator platform guiding unit 910 instructing the elevator platform guiding system 818 to move the elevator platform 850 to the predetermined loading position (e.g., a predetermined height within a main elevator shaft of the storage station) that is predetermined to align the container 200 for extraction through the top passage 812 of the housing 802 and to also align the capture system 210 of the container 200 for engagement by the actuator system 838 (as in FIG. 8c).

Once the CCU 902 determines that the elevator platform 850 is at the predetermined loading position with a container 200 ready for pick-up (as in FIGS. 8c and 5a), the CCU 902 then outputs a signal to the actuator unit 914 instructing extension of the slats 840 of the actuator system 838 to engage and open the capture system 210 of the container 200 (as in FIG. 8d). Once the capture unit 916 determines the slats 840 have properly engaged with the capture system 210, the capture unit 916 then outputs a signal to the CCU 902 indicating the capture system 210 is in an open state (as in FIG. 5b). The CCU 902 then outputs a signal directing the UAV communications relay 952 to instruct the UAV 400 that the container 200 is available for pick-up.

Upon receiving a signal indicating the container 200 is available for pick-up, the UAV 400 activates the UAV suspension system to lower the retractable cable 402 having the load-bearing element 404 into the downwardly tapered funnel 814 (as in FIG. 8d). The funnel 814, together with the extended funnel shape formed from the extended slats 840, guides the load-bearing element 404 into the capture space 216 of the capture system 210 on the container 200 (as in FIGS. 8e and 5c). Upon determining the load-bearing element 404 has been received in the capture space 216, the load-bearing unit 918 outputs a signal to the CCU 902 confirming the same, and the CCU 902 outputs a signal instructing the actuator unit 914 to retract the slats 840 (as in FIGS. 8f and 5d), thereby allowing the capture system 210 to return to a closed position with the load-bearing element 404 entrapped therein (as in FIG. 5e).

Once the slats 840 are fully retracted, the actuator unit 914 outputs a signal to the CCU 902 confirming the same, and the CCU 902 then outputs a signal directing the UAV communications relay 952 to instruct the UAV 400 that the container 200 is ready for removal. The UAV 400 then retracts the cable 402 thereby raising the container 200 that is supported thereon by entrapment of the load-bearing element 404 within the capture system 210. As the cable 402 is raised, the container 200 enters into the upwardly tapered funnel 816 through the lower enlarged inlet 822 and is guided through the chute 820 and out the upper contracted outlet 824, such that the container 200 is aligned for exiting the housing 802 through the opened top passage 812 (as in FIG. 8g). Upon determining there has been a change in the load state of the elevator platform 850, the elevator platform guiding unit 910 outputs a signal to the CCU 902 indicating the container 200 has been removed from the elevator platform 850.

In examples where the funnel 814 includes a telescoping intermediate channel 832, the CCU 902 next outputs a signal to the telescoping channel unit 922 instructing retraction of the telescoping channel 832 from the opened top passage 812. The CCU 902 then outputs a signal instructing the top hatch unit 912 to close the top hatch 810. The CCU 902 may then output a signal directing the delivery server communications relay 956 to contact one or more delivery servers to update the load state of both the storage station 800 and the UAV 400.

A storage station such as that described herein enables a point-to-point delivery system and method whereby packages may be delivered directly to an intermediate destination via the operation of one or more UAVs in traversing one or more portions of the delivery route by air.

Figure 10A:
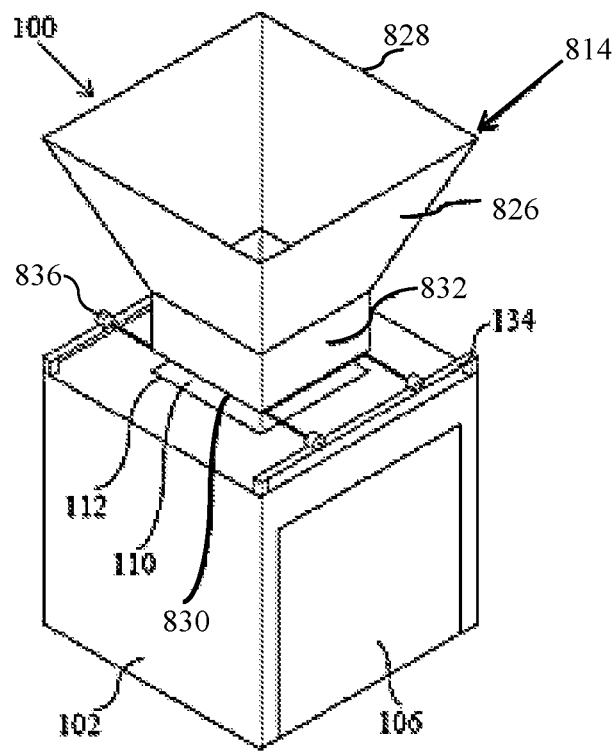
FIG. 10a shows an isolated view of the transfer station in the multi-unit station according to FIG. 9.
Figure 10B:
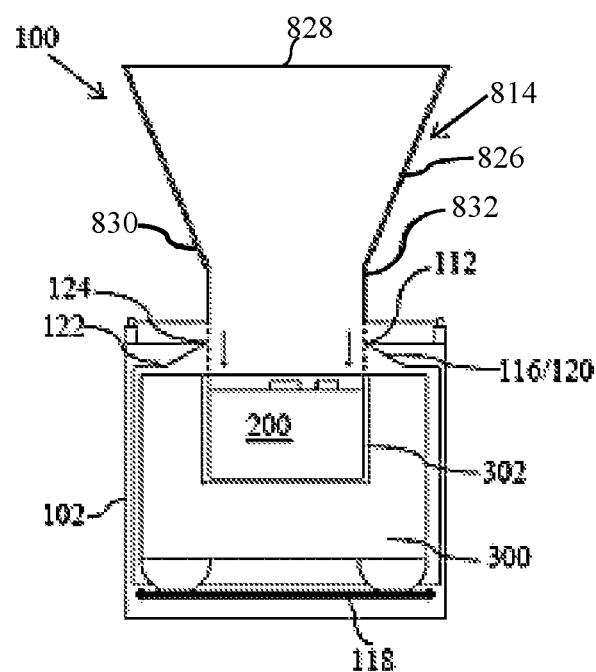
Figure 11:
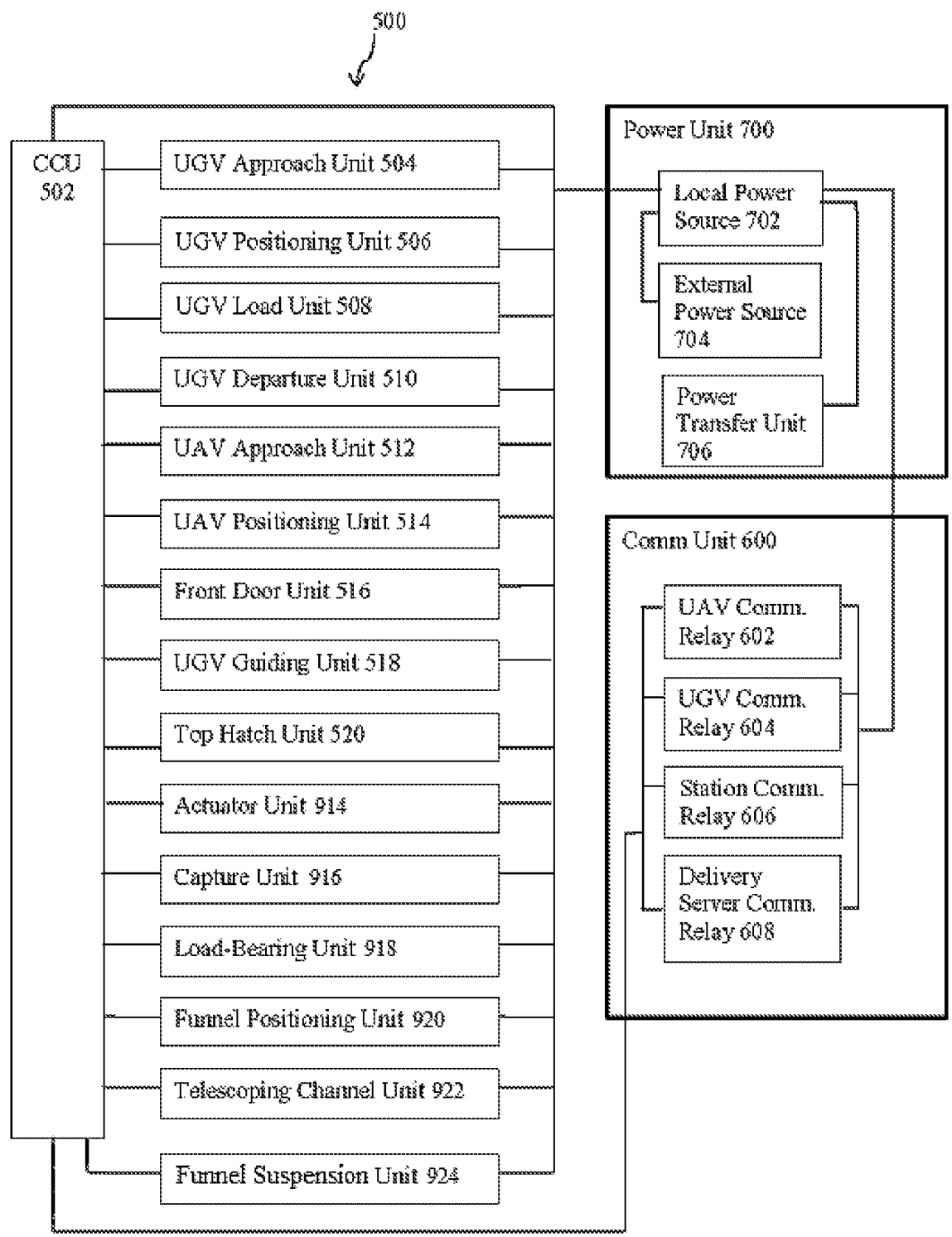
FIG. 11 shows a schematic of a control system of the transfer station in the multi-unit station according to FIG. 9.

FIG. 9 shows one example of a multi-unit station 800' that includes a storage station 800 engaged with a transfer station 100 that is be substantially identical to that described in U.S. Ser. No. 15/416,639, and as shown in FIGS. 10a-10b. Though adopting the transfer station 100 as described in U.S. Ser. No. 15/416,639, the multi-unit 800' is provided with the downward funnel 814 (rather than a downward funnel 114 as described in U.S. Ser. No. 15/416,639). It is also preferable the transfer station 100 be modified from that disclosed in U.S. Ser. No. 15/416,639 such that the CCU 502 thereof is directly communicable with each funnel-unit of the funnel 814, including the funnel suspension unit 924, as shown in FIG. 11.

When a delivery server determines the storage station 800 of a multi-unit station 800' is storing a container 200 that is ready for UGV pick-up, the delivery server outputs a signal instructing a UGV 300 that is available to receive a container 200 to travel to the multi-unit station 800' to pick-up the container 200 (i.e., an inter-station transport transfer). FIGS. 12a-12k, 5a-5f and 4a-4e show one example of the operations that may be performed in an inter-station transport transfer.

The transfer station 100, and the control system 500 thereof, will coordinate the arrival and positioning of the UGV 300 within a predetermined position inside the transfer station 100 for reception of the container 200, in a manner such as that described in U.S. Ser. No. 15/416,639, the entire contents and disclosure of which is incorporated herein by reference. Once the CCU 502 of the transfer station 100 determines the UGV 300 is parked at a predetermined position within the transfer station 100 for receiving a container 200, and that a holding space 302 of the UGV 300 has capacity to receive a container 200, the station communications relay 606 of the transfer station 100 will communicate with the station communications relay 954 of the storage station 800 to indicate the UGV 300 is ready for reception of a container 200, and the station communications relay 954 will communicate the same to the CCU 902 the storage station 800.

The CCU 902 will output a signal to the funnel positioning unit 920 instructing the funnel 814 to move along the tracks 134/834 as needed to align with the top hatch 810 of the storage station 800. Once the funnel 814 is aligned with the top hatch 810, the funnel positioning unit 920 will output a signal to the CCU 902 confirming funnel alignment. The CCU 902 then outputs a signal to the top hatch unit 912 instructing opening of the top hatch 810. If the funnel 814 includes a telescoping intermediate channel 832, the CCU 902 also outputs a signal to the telescoping channel unit 922 instructing extension of the telescoping channel 832 through the opened top passage 812.

The CCU 902 outputs a signal to the elevator platform guiding unit 910 instructing the elevator platform guiding system 818 to move the elevator platform 850 to align with a storage compartment 856 that is holding a container 200 ready for conveyance to the UGV 300 (as in FIG. 12a). Once the elevator platform 850 is aligned with the designated storage compartment 856, the CCU 902 then outputs a signal to the elevator platform guiding unit 910 instructing the conveyor belts 854 to extract the container 200 from the storage compartment 856 to the predetermined position 850 of the elevator platform 850 (as in FIG. 12b). With the container 200 at the holding space 852, the CCU 902 outputs a signal to the elevator platform guiding unit 910 instructing the elevator platform guiding system 818 to move the elevator platform 850 to the predetermined loading position (e.g., a position at a predetermined height within a main elevator shaft of the storage station) that is predetermined to align the container 200 for extraction through the top passage 812 and to also align the capture system 210 of the container 200 for engagement by the actuator system 838 (as in FIG. 12c).

Once the CCU 902 determines the container 200 is at the predetermined loading position (as in FIG. 5a), the CCU 902 then outputs a signal to the funnel suspension unit 924 instructing movement of the extendable arm 858 to the extended position (as in FIG. 12c). Once the funnel suspension unit 924 determines the extendable arm 858 is moved to the extended position and aligned with the capture system 210 of the container 200, the funnel suspension unit 924 then outputs a signal to the CCU 902 indicating the same.

The CCU 902 then outputs a signal to the actuator unit 914 instructing extension of the slats 840 of the actuator system 838 to engage and open the capture system 210 of the container 200 (as in FIG. 12c). Once the capture unit 916 determines the slats 840 have properly engaged with the capture system 210, the capture unit 916 then outputs a signal to the CCU 902 indicating the capture system 210 is in an open state (as in FIG. 5b). The CCU 902 then outputs a signal directing the funnel suspension unit 924 to lower the retractable cable 860 having the load-bearing element 862 (as in FIG. 12d) to thereby insert the load-bearing element 860 into the capture space 216 of the container capture system 210 (as in FIG. 5c). Upon determining the load-bearing element 862 has been received in the capture space 216, the load-bearing unit 918 outputs a signal to the CCU 902 confirming the same, and the CCU 902 outputs a signal instructing the actuator unit 914 to retract the slats 840 (as in FIGS. 12e and 5d), thereby allowing the capture system 210 to return to a closed position with the load-bearing element 862 entrapped therein (as in FIG. 5e).

Once the slats 840 are fully retracted, the actuator unit 914 outputs a signal to the CCU 902 confirming the same, and the CCU 902 then outputs a signal to the funnel suspension unit 924 instructing the retraction of the cable 860 thereby raising the container 200. As the cable 860 is raised, the container 200 enters into the upwardly tapered funnel 816 through the lower enlarged inlet 822 and is guided through the chute 820 and out the upper contracted outlet 824, such that the container 200 is aligned for exiting the housing 802 through the opened top passage 812. Upon determining there has been a change in the load state of the elevator platform 850, the elevator platform guiding unit 910 outputs a signal to the CCU 902 indicating the container 200 has been removed from the elevator platform 850.

Once it is determined the retractable cable 860 has been retracted sufficiently to lift the container 200 into the chute 826 of the funnel 814, and that the container 200 has fully passed through the top passage 812 of the storage station housing 802 (as in FIG. 12f), the CCU 902 then outputs a signal to the telescoping channel unit 922 instructing retraction of the telescoping channel 832 from the opened top passage 812, and outputs another signal instructing the top hatch unit 912 to close the top hatch 810.

The CCU 902 will then output a signal to the funnel positioning unit 920 instructing the funnel 814 to move along the tracks 834/134 of the multi-unit station 800' to align with the top hatch 110 of the transfer station 100 that is housing the UGV 300 (as in FIG. 12g). Once the funnel 814 is aligned with the top hatch 110 of the transfer station 100, the funnel positioning unit 920 will output a signal to the CCU 502 of the transfer station 100 confirming funnel alignment.

The CCU 502 of the transfer station 100 then outputs a signal to a top hatch unit 520 instructing opening of a top hatch 110 of the transfer station 100. In some examples the UGV 300 may include a holding hatch that encloses the holding space 302 thereof; and in such instances the CCU 502 will also instruct the UGV communications relay 604 of the transfer station 100 to output a signal to the UGV 300 to open the holding hatch to expose the holding space 302. In examples where the funnel 814 includes a telescoping intermediate channel 832, the CCU 502 also outputs a signal to the telescoping channel unit 922 instructing extension of the telescoping channel 832 through the opened top passage 112 of the transfer station 100.

The CCU 502 then outputs a signal to the funnel suspension unit 924 instructing the lowering of the retractable cable 860 supporting the container 200 (as in FIG. 12h). As the cable 860 is lowered, the container 200 is guided through the chute 826 and out the lower contacted outlet 830, such that the container 200 is aligned both for entry through the opened top passage 112 of the transfer station housing 102 and reception within the holding space 302 of the UGV 300 parked in the transfer station 100 (as in FIG. 12h).

Figure 4A:
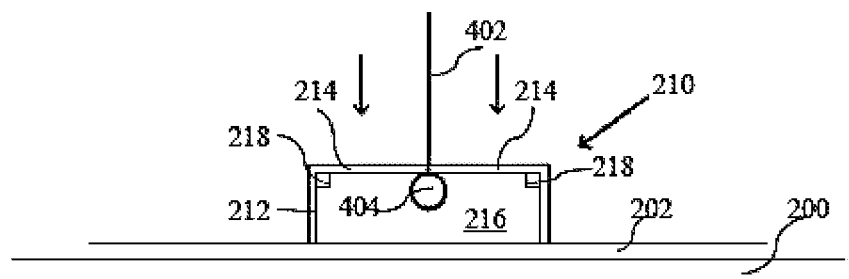
FIGS. 4a-4e show the interaction of a load-bearing element of a suspension system and a capture system of a reusable container in performing a drop-off transfer of a container according to the present invention.
Figure 4B:
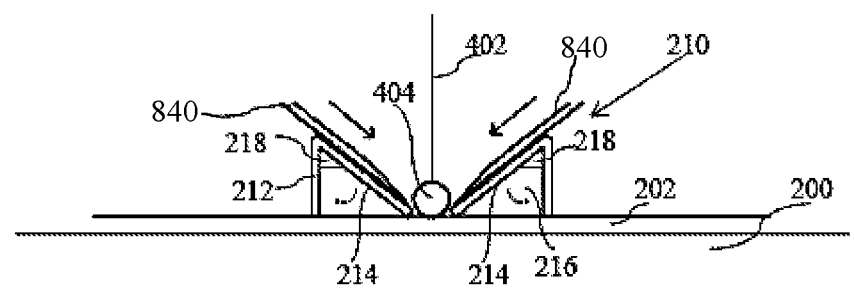
Figure 4C:
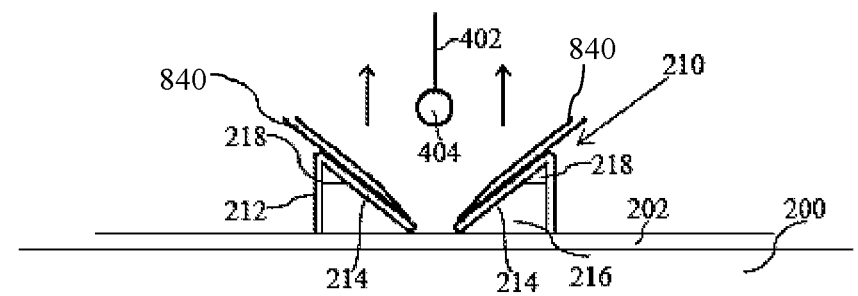
Figure 4D:
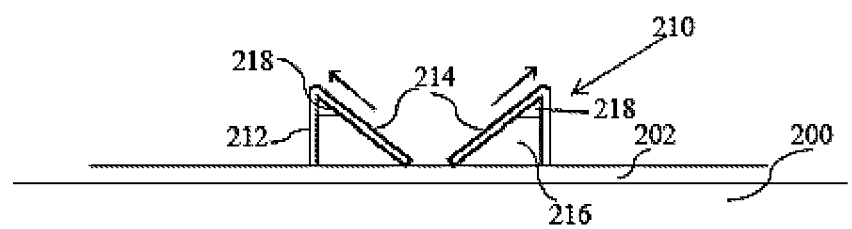
Figure 4E:
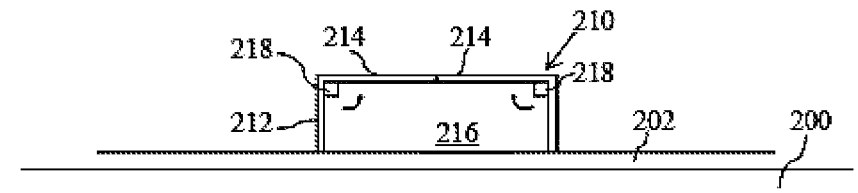

Upon determining there has been a change in the load state of the UGV 300, the UGV load unit 508 of the transfer station 100 outputs a signal to the CCU 502 indicating that the container 200 has been received within the holding space 302 of the UGV 300 (as in FIG. 4a). The CCU 502 then outputs a signal to the actuator unit 914 instructing extension of the slats 840 of the actuator system 838 to open the capture system 210 of the container 200 (as in FIG. 12i). Once the capture unit 916 determines the slats 840 have properly engaged with the capture system 210, the capture unit 916 then outputs a signal to the CCU 502 indicating the capture system 210 is in an open state (as in FIG. 4b). The CCU 502 then outputs a signal to the funnel suspension unit 924 instructing retraction of the retractable cable 860, thereby removing the load-bearing element 862 from the capture system 210 (as in FIG. 4c). Upon determining the load-bearing element 862 has been removed from the capture space 216, the load-bearing unit 918 outputs a signal to the CCU 502 indicting the same, and the CCU 502 then outputs a signal instructing the funnel suspension unit 924 instructing movement of the extendable arm 858 to the stowed position (as in FIG. 12j). The CCU 502 then outputs a signal instructing the actuator unit 914 to retract the slats 840 (as in FIGS. 12k and 4d), thereby allowing the capture system 210 of the container 200 to return to a closed position (as in FIG. 4e).

The CCU 502 then outputs a signal to the telescoping channel unit 922 instructing retraction of the telescoping channel 832 from the opened top passage 112, and outputs a signal instructing the top hatch unit 520 to close the top hatch 110. The CCU 502 may then output a signal directing a delivery server communications relay 608 of the transfer station 100 to contact one or more delivery servers to update the load state of both the UGV 300 parked in the transfer station 100 and the storage state of the storage station 800. The control system 500 will then coordinate the exit of the UGV 300 from the transfer station 100 in a manner such as that described in U.S. Ser. No. 15/416,639.

When a delivery server determines that a UGV 300 is ready to deliver a container 200 to a transfer station 100, though also determines there is not available any UAV 400 to directly receive the container 200, then the delivery server may instead direct the UGV 300 to a multi-unit station 800' that is inclusive of a storage station 800 that has a vacant storage compartment 856 available to receive the container 200 for temporary storage until such time that a UAV 400 becomes available (i.e., an inter-station storage transfer). FIGS. 13a-13k, 5a-5f and 4a-4e show one example of the operations that may be performed in an inter-station storage transfer.

The transfer station 100, and the control system 500 thereof, will coordinate the arrival and positioning of the UGV 300 within a predetermined position inside the transfer station 100 for delivery of the container 200, in a manner such as that described in U.S. Ser. No. 15/416,639, the entire contents and disclosure of which is incorporated herein by reference. Once the CCU 502 of the transfer station 100 determines the UGV 300 is parked at a predetermined position within the transfer station 100 for delivering the container 200, and that a holding space 302 of the UGV 300 is ready to release the container 200, the station communications relay 606 of the transfer station 100 will communicate with the station communications relay 954 of the storage station 800 to indicate that an inter-station storage transfer is being commenced.

The CCU 502 will output a signal to the funnel positioning unit 920 instructing the funnel 814 to move along the tracks 834/134 as needed to align with the top hatch 110 of the transfer station 100. Once the funnel 814 is aligned with the top hatch 110, the funnel positioning unit 920 will output a signal to the CCU 502 confirming funnel alignment.

The CCU 502 then outputs a signal to the top hatch unit 520 instructing opening of the top hatch 110. If the funnel 814 includes a telescoping intermediate channel 832, the CCU 502 also outputs a signal to the telescoping channel unit 922 instructing extension of the telescoping channel 832 through the opened top passage 112. In some examples the UGV 300 may include a holding hatch that encloses the holding space 302 thereof; and in such instances the CCU 502 will also instruct the UGV communications relay 604 to output a signal to the UGV 300 to open the holding hatch to expose the holding space 302.

Once the CCU 502 determines the container 200 is ready for pick-up (as in FIGS. 13a and 5a), the CCU 502 then outputs a signal to the funnel suspension unit 924 instructing movement of the extendable arm 858 to the extended position (as in FIG. 13b). Once the funnel suspension unit 924 determines the extendable arm 858 is moved to the extended position and aligned with the capture system 210 of the container 200, the funnel suspension unit 924 then outputs a signal to the CCU 502 indicating the same.

The CCU 502 then outputs a signal to the actuator unit 914 instructing extension of the slats 840 of the actuator system 838 to engage and open the capture system 210 of the container 200 (as in FIG. 13b). Once the capture unit 916 determines the slats 840 have properly engaged with the capture system 210, the capture unit 916 then outputs a signal to the CCU 502 indicating the capture system 210 is in an open state (as in FIG. 5b). The CCU 502 then outputs a signal directing the funnel suspension unit 924 to lower the retractable cable 860 having the load-bearing element 862 (as in FIG. 13c) to thereby insert the load-bearing element 860 into the capture space 216 of the container capture system 210 (as in FIG. 5c). Upon determining the load-bearing element 862 has been received in the capture space 216, the load-bearing unit 918 outputs a signal to the CCU 502 confirming the same, and the CCU 502 outputs a signal instructing the actuator unit 914 to retract the slats 840 (as in FIGS. 13d and 5d), thereby allowing the capture system 210 to return to a closed position with the load-bearing element 862 entrapped therein (as in FIG. 5e).

Figure 5F:
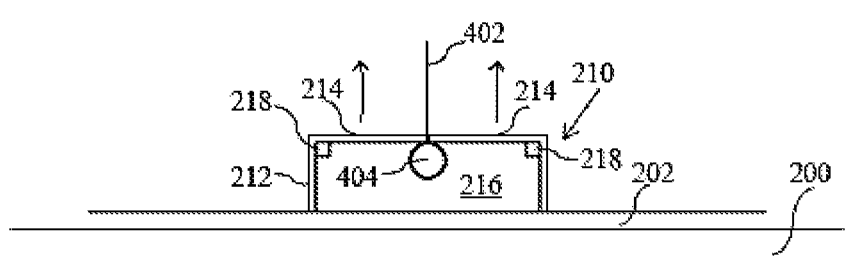

Once the slats 840 are fully retracted, the actuator unit 914 outputs a signal to the CCU 502 confirming the same, and the CCU 502 then outputs a signal to the funnel suspension unit 924 instructing the retraction of the cable 860 thereby raising the container 200 (as in FIG. 5f). As the cable 860 is raised, the container 200 enters into the upwardly tapered funnel 116 through the lower enlarged inlet 122 and is guided through the chute 120 and out the upper contracted outlet 124, such that the container 200 is aligned for exiting the transfer station housing 102 through the opened top passage 112. Upon determining there has been a change in the load state of the UGV 300, the UGV load unit 508 outputs a signal to the CCU 502 indicating the container 200 has been removed from the UGV 300.

Once it is determined the retractable cable 860 has been retracted sufficiently to lift the container 200 into the chute 826 of the funnel 814, and that the container 200 has fully passed through the top passage 112 of the transfer station housing 102 (as in FIG. 13e), the CCU 502 then outputs a signal to the telescoping channel unit 922 instructing retraction of the telescoping channel 832 from the opened top passage 112, and outputs another signal instructing the top hatch unit 520 to close the top hatch 110.

The CCU 502 will then output a signal to the funnel positioning unit 920 instructing the funnel 814 to move along the tracks 134/834 of the multi-unit station 800' to align with the top hatch 810 of the storage station 800 that has a vacant storage compartment 856 available to receive the container 200 (as in FIG. 13f). Once the funnel 814 is aligned with the top hatch 810 of the storage station 800, the funnel positioning unit 920 will output a signal to the CCU 902 of the storage station 100 confirming funnel alignment.

The CCU 902 of the storage station 800 then outputs a signal to the top hatch unit 912 instructing opening of the top hatch 810 of the storage station 800, and the CCU 902 then outputs a signal to the telescoping channel unit 922 instructing extension of the telescoping channel 832 through the opened top passage 812. The CCU 902 outputs a signal to the elevator platform guiding unit 910 instructing the elevator platform guiding system 818 to move the elevator platform 850 to the predetermined loading position (e.g., a position at a predetermined height within a main elevator shaft of the storage station) that is predetermined to align the holding space 852 of the elevator platform 850 for reception of the container 200 through the top passage 812 and to also align the capture system 210 of the container 200 (once received at the holding space 852) for engagement by the actuator system 838 (as in FIG. 13f)

The CCU 902 then outputs a signal to the funnel suspension unit 924 instructing the lowering of the retractable cable 860 supporting the container 200. As the cable 860 is lowered, the container 200 is guided through the chute 826 and out the lower contacted outlet 830, such that the container 200 is aligned both for entry through the opened top passage 812 of the storage station housing 802 and reception within the holding space 852 of the elevator platform 850 (as in FIG. 13g).

Upon determining there has been a change in the load state of the elevator platform 850, the elevator platform guiding unit 910 outputs a signal to the CCU 902 indicating that the container 200 has been received within the holding space 852 of the elevator platform 850 (as in FIG. 4a). The CCU 902 then outputs a signal to the actuator unit 914 instructing extension of the slats 840 of the actuator system 838 to open the capture system 210 of the container 200 (as in FIG. 13h). Once the capture unit 916 determines the slats 840 have properly engaged with the capture system 210, the capture unit 916 then outputs a signal to the CCU 902 indicating the capture system 210 is in an open state (as in FIG. 4b). The CCU 902 then outputs a signal to the funnel suspension unit 924 instructing retraction of the retractable cable 860, thereby removing the load-bearing element 862 from the container capture system 210 (as in FIG. 4c). Upon determining the load-bearing element 862 has been removed from the capture space 216, the load-bearing unit 918 outputs a signal to the CCU 902 indicting the same, and the CCU 902 then outputs a signal instructing to the funnel suspension unit 924 instructing movement of the extendable arm 858 to the stowed position (as in FIG. 13i). The CCU 502 then outputs a signal instructing the actuator unit 914 to retract the slats 840 (as in FIGS. 13j and 4d), thereby allowing the capture system 210 of the container 200 to return to a closed position (as in FIG. 4e).

The CCU 902 then outputs a signal to the telescoping channel unit 922 instructing retraction of the telescoping channel 832 from the opened top passage 812, and outputs a signal instructing the top hatch unit 912 to close the top hatch 810.

With the container 200 at the holding space 852, the CCU 902 outputs a signal to the elevator platform guiding unit 910 instructing the elevator platform guiding system 818 to move the elevator platform 850 to align with a vacant storage compartment 856 that is ready to receive the container 200 (as in FIG. 13j). Once the elevator platform 850 is aligned with the designated storage compartment 856, the CCU 902 then outputs a signal to the elevator platform guiding unit 910 instructing the conveyor belts 854 to insert the container 200 into the storage compartment 856 from the elevator platform 850 (as in FIG. 13k).

The CCU 902 may then output a signal directing the delivery server communications relay 956 to contact one or more delivery servers to update the load state of both the UGV 300 parked in the transfer station 100 and the storage state of the storage station 800.

In the foregoing examples of the inter-station transfers (for removing a container from storage and for placing a container into storage) each of the funnel-units (e.g., the actuator unit 914; the capture unit 916; the load-bearing unit 918; the funnel positioning unit 920; the telescoping channel unit 922; and the funnel suspension unit 924) is directly communicable with the both the CCU 902 of the storage station 800 and the CCU 502 of the transfer station 100 as needed (e.g., via corresponding transceivers at each funnel-unit and at both the CCU 902 and the CCU 502). However, in other examples one or more funnel-units may not be directly communicable with the CCU 902 and/or the CCU 502, and may instead directly communicate with only one of the CCU 902 or the CCU 502, and that CCU may then coordinate communications with the other CCU through the respective station communications relays 954/606 of the storage and transfer stations 800/100. Alternatively, one or more funnel-units may directly communicate with a central control system that manages all operations among the separate modular stations in the multi-unit station 800', and the central control system may then coordinate communications with the CCU 902 and the CCU 502 via the respective station communications relays 954/606.

If the predetermined loading position of the elevator platform 850 is spaced from the top passage 812 sufficiently to present a possibility that a suspended container 200 might rotate or twist while passing through the inner space 804 of the housing 802 (e.g., after entering the inner space 804 through the top passage 812, though prior to contacting the elevator platform 850; or after being lifted off the elevator platform 850, though prior to entering the top passage 812), then the guiding system 818 may be made operable to move the elevator platform in a manner to avoid such concerns. For example, when receiving a container 200, the elevator platform 800 may initially be positioned substantially adjacent the top passage 812 such that a container 200 being delivered to the storage station 800 will be received at the holding space 852 of the elevator platform 850 as it passes through the top passage 812. Upon determining the container 200 has contacted the holding space 852, the guiding system 818 may then lower the elevator platform 850 toward the predetermined loading position in a manner to correspond with lowering of the suspension system on which the container 200 is suspended. Similarly, when presenting a container 200 for removal, the elevator platform 800 may initially be positioned at the predetermined loading position such that the actuator system 838 may operate to engage the capture system 210 of the container 200 with a suspension system. Upon determining the load of the container 200 on the elevator platform 850 is being reduced (i.e., via lifting of the container by the suspension system), the guiding system 818 may then raise elevator platform 850 toward the top passage 812 in a manner to correspond with raising of the suspension system on which the container 200 is suspended. By moving the elevator platform 850 in a manner to correspond with the lower and raising movements of a suspension system, the guiding system 818 may use the elevator platform 850 to move the container 200 in a manner that will prevent rotation or twisting of the container 200 within the inner space 804 between the predetermined loading position and the top passage 812.

Alternatively, the storage station 800 may be adapted to forego any need for a container 200 to travel through the inner space 804 of the housing 802 while suspending by a suspension system. For example, a length of the intermediate channel 832 and a taper angle of the chute 826 of the downward channel 814 may be made to correspond in such a manner that the slats 840 of the actuator system 838 may interact with a capture system 210 of a container 200 while the container is resting on an elevator platform 850 that is positioned substantially adjacent the top passage 812. With such an arrangement, containers 200 may be received at and removed from the holding space 852 of the elevator platform 850 without requiring the containers to travel through any appreciable portion of the inner space 804.

Storage stations such as that described herein may be installed at various locations to establish a storage grid around a city or geographical region to be serviced. The storage stations may be located exclusively outside populated areas of the city or region to be served; or they may be located within populated areas, though at designated locations that are deemed to present minimal to no interference with the local population (e.g., sidewalks, parking lots, building roofs, or any open areas with sufficient clearance). By establishing such storage grids at separate cities or regions, there may then be created a large scale storage network for long distance transportation of packages where UAVs may be used to traverse longer portions of the delivery route. In some instances the storage station may be provided on the local premises or property of a business or government. This may allow businesses or governments to benefit from quick and efficient item storage via a fully automated system. However, storage stations such as that described herein may also be used simply at entertainment venues or events such as: amusement parks, carnivals, sport events, cruises, concerts, large weddings or private functions to facilitate the storage of items or packages for attendees or guests.

A storage station, a multi-unit station including a storage station in combination with one or more other types of transport stations (e.g., a transfer station), and a delivery system including such storage stations and/or multi-unit stations, may be used for business-to-business deliveries, business-to-consumer deliveries, and consumer-to-consumer deliveries. A delivery system according to the present invention may also be operable with a software application that can be downloaded to remote systems having a user-interface. In this way, companies may download the application for use in delivering packages from warehouses or stores directly to customers; and individuals may download the application for use in sending private, non-retail packages directly to one-another. In operations where the storage station is connected to a transfer station, a reusable container may need to be provided to a transfer station after a UAV has taken a package-carrying container away from a UGV parked therein. This may be accomplished through the use of the storage station where additional containers could be stored and be transferred to the UGVs, as explained herein.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

It will be appreciated that a storage station according to the present invention is scalable, and may be made to any suitable dimensions for accommodating containers of many various sizes and shapes; and that a storage station may also be made to have any number of top passages (with or without top hatches) and corresponding funnels for facilitating transfer of containers with an elevator platform having any number of holding spaces. It will also be appreciated that a storage station according to the present invention may be made with side doors on any side of the storage station, with a corresponding side door provided for each individual storage compartment so as to enable a direct access to each of the individual storage compartments with ease from the exterior environment by users. It will also be appreciated that a storage station according to the present invention may be provided with multiple storage compartments, though only a single side door that communicates with an automated system for accessing each of the individual storage compartments based on a user input.

It will be appreciated that a storage station according to the present invention may be constructed as a grounded structure, or may be supported on another foundation or structure as needed. For example, a storage station may be supported on a raised structure (e.g., stilts) to protect it from potential flooding. A storage station may have multiple rows of single elevator stations that may house additional containers for cleaning and maintenance. Multiple stations (e.g., of the same or different types) may be aggregated on top of one another, side-by-side, or under landscape elements such as planter boxes or even bleachers for public seating; and may be built into the landscape in many variations.

A storage station according to the present invention may also be constructed with a movement mechanism (e.g., a set of wheels) that may enable autonomous driving of the storage station itself, for movement of the station between different locales. In this way, if demand in a certain area was high during certain times of the day then a nearby station that is not in use may relocate to the area of high demand to assist in the increased demand at that area.

Though the foregoing examples describe the storage station and methods in the context of package storage services, it will be understood that this is but one non-limiting example of the invention and its use; and that the invention may be put to use for other purposes.

It will also be appreciated that a storage station according to the present invention may use an actuator system that uses a mechanism other than the flaps discussed herein. For example, a storage station according to the present invention may use an actuator system that includes an arm that extends outward, inward, downward and/or upward and which has the shape of a small funnel for connecting to lower portion of the downwardly tapering funnel, and which has a diameter corresponding with outer dimensions of the UAV load-bearing element. The arm could be limited to a single movement direction, provided it is able to interact with the capture system of the container for guiding the load-bearing element into the capture system for pick-ups and ejecting the load-bearing element from the capture system for drop-offs.

It will also be appreciated that a storage station according to the present invention may include one or more safety systems, including caution lights or other signaling systems that activate when the storage station is interacting with a UAV for alerting bystanders; as well as one or more cameras or other monitoring systems for observing and/or recording operation of the storage station; and one or more shut-down systems for terminating operation of the storage station if there is detected a failure or emergency during operation thereof. It will also be appreciated that the storage station may also serve as a pick-up and drop-off location for customer orders, with customers accessing the individual storage compartments through side doors at an exterior side of the storage station housing.

While the disclosed methods may be performed by executing all of the disclosed steps in the precise order disclosed, without any intermediate steps therebetween, those skilled in the art will appreciate that the methods may also be performed: with further steps interposed between the disclosed steps; with the disclosed steps performed in an order other than the exact order disclosed; with one or more disclosed steps performed simultaneously; and with one or more disclosed steps omitted.

The present invention is not limited to the exemplary embodiments illustrated herein, but is instead characterized by the appended claims.

What is claimed is:

1. A storage station for storing containers, the storage station comprising:
    a housing comprising a top passage and an inner space, the top passage connecting the inner space with an outer environment and being dimensioned for passage of a container, and the inner space comprising a plurality of storage compartments each dimensioned for receiving a container;
    an elevator platform within the housing and movable between a loading position aligned with the top passage and storage positions aligned with each of the storage compartments;
    an actuator system configured to interact with a capture system of a container for selectively engaging a suspension system to the capture system and disengaging a suspension system from the capture system; and
    a downward funnel supported above the housing, the downward funnel comprising a chute having an upper enlarged inlet and a lower contracted outlet, the lower contracted outlet being dimensioned to communicate with the top passage of the housing for passage of a container, wherein
    the downward funnel comprises a funnel suspension system, and the actuator system is configured to interact with a capture system of a container for selectively engaging the funnel suspension system to the capture system and disengaging the funnel suspension system from the capture system.

2. The storage station according to claim 1, wherein the actuator system comprises one or more extendable and retractable slats that are configured, when in the extended position, to interact with a capture system of a container to selectively engage a load-bearing element of a suspension system to the capture system and disengage a load-bearing element of a suspension system from the capture system.

3. The storage station according to claim 2, wherein the one or more slats are configured, when in the extended position, to open a capture space of a capture system of a container.

4. The storage station according to claim 3, wherein the one or more slats are configured, when in the extended position, to form an extended guiding structure for guiding a load-bearing element of a suspension system into an opened capture space of a container.

5. The storage station according to claim 1, wherein the funnel suspension system comprises a suspension arm and a retractable cable having a load-bearing element dimensioned for reception in a capture space of a container.

6. The storage station according to claim 5, wherein the suspension arm is an extendable arm that is movable between a stowed position and an extended position, the stowed position being a position in which the suspension arm is stored in a manner to prevent obstruction to a container passing through the downward funnel, and the extended position being a position in which the suspension arm is aligned for deploying the load-bearing element on the retractable cable for reception in a capture space of a container that is supported on the elevator platform.

7. The storage station according to claim 1, further comprising:
a central control unit, wherein
the central control unit is configured to:
receive a signal indicating that a suspension system is positioned above the top passage and ready to extract a container,
control the storage station to interact with the suspension system to extract a container from the storage station by the suspension system.

8. The storage station according to claim 7, wherein the central control unit is configured to control the storage station to interact with the suspension system to extract a container from the storage station by:
instructing the elevator platform to move to a storage position aligned with a storage compartment that is storing a container,
instructing the elevator platform to extract the container from the aligned storage compartment,
instructing the elevator platform, with the extracted container supported thereon, to move to the loading position aligned with the top passage,
instructing the actuator system to engage a capture system on the container supported on the elevator platform at the loading position to open a capture space of the capture system,
receiving a signal indicating that the extracting suspension system has engaged the capture system of the container, and
instructing the actuator system to disengage the capture system of the container supported on the elevator platform at the loading position to close the capture space of the capture system.

9. The storage station according to claim 1, further comprising:

a central control unit, wherein
the central control unit is configured to:
receive a signal indicating that a suspension system is positioned above the top passage and ready to insert a container,
control the storage station to interact with the suspension system to receive a container from the suspension system.

10. The storage station according to claim 9, wherein the central control unit is configured to control the storage station to interact with the suspension system to insert a container into the storage station by:
instructing the elevator platform to move to the loading position aligned with the top passage,
receiving a signal indicating that a container has been placed on the elevator platform at the loading position,
instructing the actuator system to engage a capture system on the container supported on the elevator platform at the loading position to open a capture space of the capture system,
receiving a signal indicating that the inserting suspension system has disengaged the capture system of the container,
instructing the actuator system to disengage the capture system of the container supported on the elevator platform at the loading position to close the capture space of the capture system,
instructing the elevator platform, with the container supported thereon, to move to a storage position aligned with a storage compartment ready to receive a container, and
instructing the elevator platform to insert the container support thereon into the aligned storage compartment.

11. A multi-unit station, comprising
a storage station for storing containers, the storage station comprising:
a housing comprising a top passage and an inner space, the top passage connecting the inner space with an outer environment and being dimensioned for passage of a container, and the inner space comprising a plurality of storage compartments each dimensioned for receiving a container;
an elevator platform within the housing and movable between a loading position aligned with the top passage and storage positions aligned with each of the storage compartments; and
an actuator system configured to interact with a capture system of a container for selectively engaging a suspension system to the capture system and disengaging a suspension system from the capture system; and
at least one additional station,
wherein the multi-unit station further comprises:
a downward funnel supported above the housing, the downward funnel comprising a chute having an upper enlarged inlet and a lower contracted outlet, the lower contracted outlet being dimensioned to communicate with the top passage of the housing for passage of a container, wherein
the downward funnel of the storage station is supported movably along a track that extends along a top of the storage station housing,
a mating track extends along a housing of the at least one additional station,
the mating track being aligned and engaged with the storage station track, and the downward funnel is moveable along the storage station track and the mating track for selectively positioning above the storage station housing and the additional station housing.

12. The multi-unit station according to claim 11, wherein the at least one additional station is a transfer station that is configured for inserting and extracting containers into and out of a UGV.

13. The multi-unit station according to claim 12, wherein the downward funnel comprises a funnel suspension system, and the actuator system is configured to interact with a capture system of a container for selectively engaging the funnel suspension system to the capture system and disengaging the funnel suspension system from the capture system.

14. The multi-unit station according to claim 13, further comprising:
one or more control units, wherein
the one or more control units are configured to:
receive a signal indicating that a UGV is positioned at the transfer station and ready to receive a container for transport, and control the multi-unit station to convey a container from the storage station to the UGV; and
receive a signal indicating that a UGV is positioned at the transfer station and ready to deliver a container for storage, and control the multi-unit station to convey a container from the UGV to the storage station.

15. The multi-unit station according to claim 14, wherein:
the one or more control units comprises multiple control units that communicate with one another to effect control of the multi-unit station.

16. The storage station according to claim 11, wherein the actuator system comprises one or more extendable and retractable slats that are configured, when in the extended position, to interact with a capture system of a container to selectively engage a load-bearing element of a suspension system to the capture system and disengage a load-bearing element a of suspension system from the capture system.

17. The storage station according to claim 16, wherein the one or more slats are configured, when in the extended position, to open a capture space of a capture system of a container.

18. The storage station according to claim 17, wherein the one or more slats are configured, when in the extended position, to form an extended guiding structure for guiding a load-bearing element of a suspension system into an opened capture space of a container.

19. The storage station according to claim 11, further comprising:
a central control unit, wherein
the central control unit is configured to:
receive a signal indicating that a suspension system is positioned above the top passage and ready to extract a container,
control the storage station to interact with the suspension system to extract a container from the storage station by the suspension system.

20. The storage station according to claim 19, wherein the central control unit is configured to control the storage station to interact with the suspension system to extract a container from the storage station by:
instructing the elevator platform to move to a storage position aligned with a storage compartment that is storing a container,
instructing the elevator platform to extract the container from the aligned storage compartment,
instructing the elevator platform, with the extracted container supported thereon, to move to the loading position aligned with the top passage,
instructing the actuator system to engage a capture system on the container supported on the elevator platform at the loading position to open a capture space of the capture system,
receiving a signal indicating that the extracting suspension system has engaged the capture system of the container, and
instructing the actuator system to disengage the capture system of the container supported on the elevator platform at the loading position to close the capture space of the capture system.

21. The storage station according to claim 11, further comprising:
a central control unit, wherein
the central control unit is configured to:
receive a signal indicating that a suspension system is positioned above the top passage and ready to insert a container,
control the storage station to interact with the suspension system to receive a container from the suspension system.

22. The storage station according to claim 21, wherein the central control unit is configured to control the storage station to interact with the suspension system to insert a container into the storage station by:
instructing the elevator platform to move to the loading position aligned with the top passage,
receiving a signal indicating that a container has been placed on the elevator platform at the loading position,
instructing the actuator system to engage a capture system on the container supported on the elevator platform at the loading position to open a capture space of the capture system,
receiving a signal indicating that the inserting suspension system has disengaged the capture system of the container,
instructing the actuator system to disengage the capture system of the container supported on the elevator platform at the loading position to close the capture space of the capture system,
instructing the elevator platform, with the container supported thereon, to move to a storage position aligned with a storage compartment ready to receive a container, and
instructing the elevator platform to insert the container support thereon into the aligned storage compartment.

* * * * *